(12) United States Patent
Hwang et al.

(10) Patent No.: US 11,265,860 B2
(45) Date of Patent: *Mar. 1, 2022

(54) METHOD OF TRANSMITTING AND RECEIVING DOWNLINK DATA CHANNEL AND APPARATUS THEREFOR

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/694,677

(22) Filed: Nov. 25, 2019

(65) Prior Publication Data

US 2020/0092869 A1    Mar. 19, 2020

Related U.S. Application Data

(63) Continuation of application No. 16/376,510, filed on Apr. 5, 2019, now Pat. No. 10,492,196.

(Continued)

(51) Int. Cl.
    *H04L 1/18* (2006.01)
    *H04L 5/00* (2006.01)
    (Continued)

(52) U.S. Cl.
    CPC .......... *H04W 72/042* (2013.01); *H04L 1/1861* (2013.01); *H04L 1/1893* (2013.01);
    (Continued)

(58) Field of Classification Search
    CPC .......... H04B 7/04–0486; H04J 11/0069–0093; H04L 1/0001–20; H04L 5/0001–26;
    (Continued)

(56) References Cited

U.S. PATENT DOCUMENTS 9,515,802 B2    12/2016 Seo et al.
10,492,196 B2 *  11/2019 Hwang ............... H04W 72/042
(Continued)

FOREIGN PATENT DOCUMENTS

EP    3624532    3/2020
EP    3709740    9/2020
(Continued)

OTHER PUBLICATIONS

Qualcomm Incorporated, "Remaining Issues on BWP," R1-1802844, Athens, Greece, Feb. 26-Mar. 2, 2018, 24 pages (Year: 2018).*

(Continued)

*Primary Examiner* — Timothy J Weidner
(74) *Attorney, Agent, or Firm* — Fish & Richardson P.C.

(57) ABSTRACT

A method of receiving a Physical Downlink Shared Channel (PDSCH) includes: receiving, in a first bandwidth part (BWP), a downlink control information (DCI) including (i) first information that indicates switching an active BWP from the first BWP to a second BWP, and (ii) second information related to scheduling at least one transport block (TB) for the PDSCH; and receiving, in the second BWP, the PDSCH based on the first information and the second information. Based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled.

5 Claims, 21 Drawing Sheets

Related U.S. Application Data

(60) Provisional application No. 62/670,024, filed on May 11, 2018, provisional application No. 62/653,532, filed on Apr. 5, 2018.

(51) Int. Cl.
  H04W 48/12 (2009.01)
  H04W 72/04 (2009.01)
  H04W 72/12 (2009.01)
  H04W 74/00 (2009.01)

(52) U.S. Cl.
  CPC .......... *H04L 5/0055* (2013.01); *H04L 5/0098* (2013.01); *H04W 48/12* (2013.01); *H04W 72/0446* (2013.01); *H04W 72/0453* (2013.01); *H04W 72/12* (2013.01); *H04W 72/1289* (2013.01); *H04W 74/006* (2013.01)

(58) Field of Classification Search
  CPC ... H04W 48/02–20; H04W 72/005–14; H04W 74/002–0891
  See application file for complete search history.

(56) References Cited

U.S. PATENT DOCUMENTS

| | | | |
|---|---|---|---|
| 2014/0105162 A1 | 4/2014 | Li et al. | |
| 2015/0358986 A1 | 12/2015 | Yang et al. | |
| 2018/0042028 A1 | 2/2018 | Nam et al. | |
| 2018/0063865 A1 | 3/2018 | Islam et al. | |
| 2019/0074929 A1 | 3/2019 | Aiba et al. | |
| 2019/0103943 A1 | 4/2019 | Wang et al. | |
| 2019/0150183 A1* | 5/2019 | Aiba | H04W 72/0446 |
| 2020/0092869 A1 | 3/2020 | Hwang et al. | |
| 2020/0187181 A1* | 6/2020 | Hwang | H04W 72/042 |
| 2020/0296758 A1* | 9/2020 | Li | H04L 5/001 |

FOREIGN PATENT DOCUMENTS

| | | | | |
|---|---|---|---|---|
| EP | 3709740 A1 * | 9/2020 | | H04L 5/001 |
| KR | 1020150089002 | 8/2015 | | |

OTHER PUBLICATIONS

Panasonic, "Discussion on HARQ-ACK transmission due to BWP switching," RI-1802441, 3GPP TSG RAN WG1 Meeting #92, Athens, Greece, Feb. 26-Mar. 2, 2018, 2 pages.
Korean Notice of Allowance in Korean Application No. 10-2019-7011238, dated Dec. 19, 2019, 4 pages (with English translation).
Huawei, HiSilicon, "DCi contents and formats in NR," R1-1719389, 3GPP TSG RAN WG1 Meeting #91, Reno, USA, dated Nov. 17-Dec. 1, 2017, 11 pages.
Huawei, HiSilicon, "Summary of remaining issues on DCI contents and formats," R1-1800070, 3GPP TSG RAN WG1 Ad Hoc Meeting, Vancouver, Canada, Jan. 22-26, 2018, 6 pages.
3rd Generation Partnership Project, Technical Specification Group Radio Access Network, NR, "Multiplexing and channel coding (Release 15)", 3GPP TS 38.212 V15.0.1 (Mar. 2018), 91 pages.
Nokia, "draftCR to 38.214 capturing the Jan. 18 ad-hoc and RAN1#92 meeting agreements," R1-1803555, 3GPP TSG-RAN1 Meeting #92, Athens, Feb. 26-Mar. 1, 2018, 77 pages.
MediaTek Inc., "Summary of Bandwidth Part Remaining Issues," R1-1801067, 3GPP TSG RAN WG1 Meeting AH 1801, Vancouver, Canada, Jan. 22-26, 2018, 23 pages.
Qualcomm Incorporated, "Remaining Issues on BWP," R1-1802844, Athens, Greece, Feb. 26-Mar. 2, 2018, 24 pages.
NTT Docomo, Inc., "Other aspects of bandwidth Parts," R1-1800680, 3GPP TSG RAN WG1 Meeting AH 1801, Vancouver, Canada, Jan. 22-26, 2018, 4 pages.
Huawei, "CR to 38.212 capturing the Jan. 18 ad-hoc and RAN1#92 meeting agreements," R1-1803553, 3GPP TSG RAN WG1 Meeting #92, Athens, dated Feb. 26-Mar. 1, 2018, 99 pages.
Japanese Office Action in Japanese Application No. 2019-540382, dated Aug. 11, 2020, 14 pages (with English translation).
NTT Docomo, Inc., "DCI contents and formats," R1-1800671, 3GPP TSG RAN WG1 Meeting AH 1801, Vancouver, Canada, dated Jan. 22-26, 2018, 12 pages.
Vivo, "Remaining issues on BWP operation," R1-1801544, 3GPP TSG RAN WG1 Meeting #92, Athens, Greece, dated Feb. 26-Mar. 2, 2018, 5 pages.
3rd Generation Partnership Project; Technical Specification Group Radio Access Network; "Radio Resource Control (RRC) protocol specification (Release 15)," 3GPP TS 38.331 V15.1.0, dated Mar. 2018, 268 pages.
Australian Office Action in Australian Application No. 2019248266, dated Oct. 30, 2020, 7 pages.
Extended European Search Report in European Application No. 19745961.3, dated Dec. 2, 2020, 14 pages.
Huawei, HiSilicon, "Details on BWP Switching Operation," R4-1802834, 3GPP TSG-RAN WG4 Meeting #86, Athens, Greece, dated Feb. 26-Mar. 2, 2018, 9 pages.
Huawei, HiSilicon, "Remaining issues on bandwidth part and wideband operation," R1-1803653, 3GPP TSG RAN WG1 Meeting #92bis, Sanya, China, dated Apr. 16-20, 2018, 10 pages.
Intel Corporation, "Overall impact in RAN2 for BWP," R2-1710592, 3GPP TSG RAN WG2 Meeting #99bis, Prague, Czech Republic, dated Oct. 9-13, 2017, 8 pages.
InterDigital, Inc., "CORESET Monitoring Under Dynamic Change of BWP," R1-1714111, 3GPP TSG RAN WG1 Meeting #90, Prague, Czech Republic, dated Aug. 21-25, 2017, 5 pages.
LG Electronics, "Remaining issues on bandwidth part operation," R1-1806629, 3GPP TSG RAN WG1 Meeting #93, Busan, Korea, dated May 21-25, 2018, 10 pages.
MediaTek Inc., "Summary of Bandwidth Part Remaining Issues," R1-1805693, 3GPP TSG RAN WG1 Meeting #92bis, Sanya, China, dated Apr. 16-20, 2018, 14 pages.
Oppo, "Timer based BWP switching," R2-1710126, 3GPP TSG RAN WG2 #99-Bis, Prague, Czech Republic, dated Oct. 9-13, 2017, 3 pages.
Vivo, "Remaining issues on CBG-based (re)transmission," R1-1801541, 3GPP TSG RAN WG1 Meeting #92, Athens, Greece, dated Feb. 26-Mar. 2, 2018, 3 pages.
Huawei, "CR to 38.212 capturing the Jan. 18 ad-hoc and RAN1#92 meeting agreements," R1-1803553, 3GPP TSG RAN WG1 Meeting #92, Athens, Greece, Feb. 26-Mar. 1, 2018, 13 pages.
Huawei, HiSilicon, "Correction on the bits of DCI fields in 38.212," R1-1800825, 3GPP TSG RAN WG1 Ad Hoc Meeting, Vancouver, Canada, Jan. 22-26, 2018, 8 pages.
Huawei, HiSilicon, "Summary of remaining issues on DCT contents and formats," R1-1800070, 3GPP TSG RAN WG1 Ad Hoc Meeting, Vancouver, Canada, Jan. 22-26, 2018, 7 pages.
Japanese Office Action in JP Appln. No. 2019-540382, dated Mar. 9, 2021, 10 pages (with English translation).
Korean Office Action in KR Appln. No. 10-2020-7007681, dated Jan. 26, 2021, 9 pages (with English translation).
Nokia, "draftCR to 38.214 capturing the Jan. 18 ad-hoc and RAN1#92 meeting agreements," R1-1803555, 3GPP TSG-RAN WG1 Meeting #92, Athens, Greece, Feb. 26-Mar. 1, 2018, 6 pages.
Russian Office Action in RU Appln. No. 2020107300, dated Jan. 18, 2021, 7 pages (with English translation).
Russian Search Report in International Appln. No. PCT/KR2019/004077, dated Apr. 5, 2019, 4 pages (with English translation).
United States Office Action in U.S. Appl. No. 16/794,819, dated Mar. 12, 2021, 23 pages.
Vivo, "Remaining issues on BWP operation," R1-1801544, 3GPP TSG RAN WG1 Meeting #92, Athens Greece, Feb. 26-Mar. 2, 2018, 6 pages.
Vivo, "Remaining issues on CBG-based (re)transmission," R1-1801541, 3GPP TSG RAN WG1 Meeting #92, Athens, Greece, Feb. 26-Mar. 2, 2018, 3 pages.
Office Action in Chinese Appln. No. 201980000781.5, dated Oct. 8, 2021, 15 pages (with English translation).

(56) References Cited

OTHER PUBLICATIONS

Vivo, "Remaining issues on CBG-based (re)transmission," R1-1801541, Presented at 3GPP TSG RAN WG1 Meeting #92, Athens, Greece, Feb. 26-Mar. 2, 2018, 3 pages.

* cited by examiner

FIG. 1
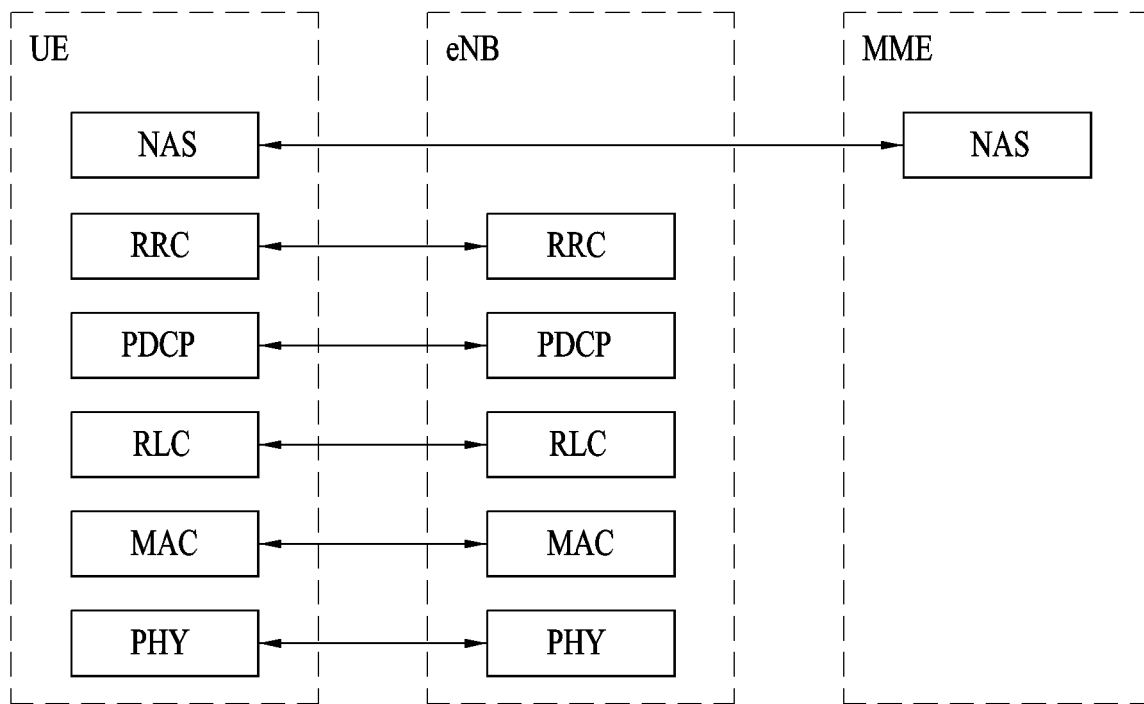
(A) CONTROL-PLANE PROTOCOL STACK
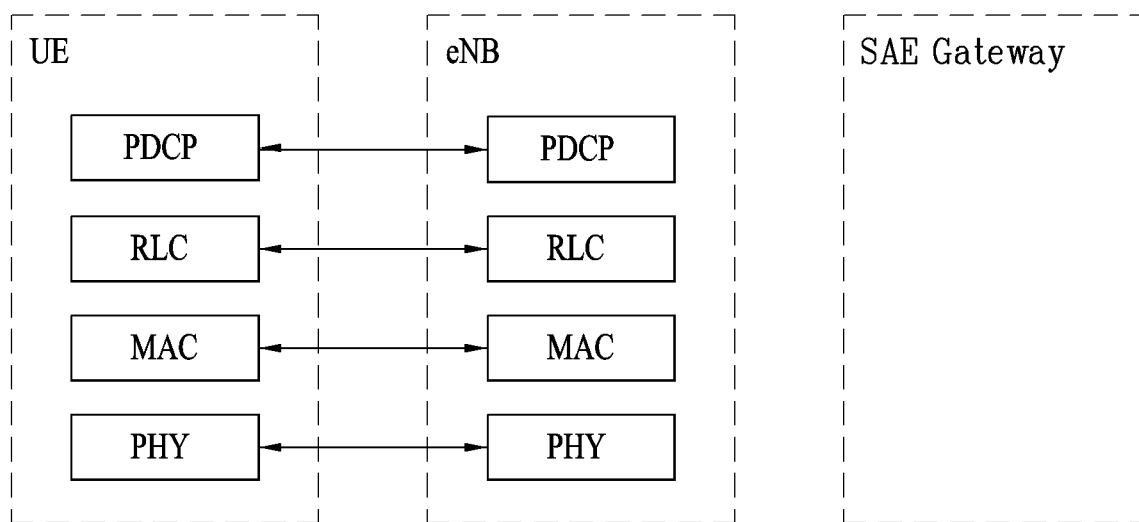
(B) USER-PLANE PROTOCOL STACK

FIG. 13

| | C-DAI=3<br>T-DAI=4 | C-DAI=1<br>T-DAI=3 | | C-DAI=2<br>T-DAI=3 | |
|---|---|---|---|---|---|
| C-DAI=1<br>T-DAI=2 | | C-DAI=2<br>T-DAI=3 | C-DAI=4<br>T-DAI=1 | | |
| C-DAI=2<br>T-DAI=2 | C-DAI=4<br>T-DAI=4 | C-DAI=3<br>T-DAI=3 | C-DAI=1<br>T-DAI=1 | C-DAI=3<br>T-DAI=3 | C-DAI=4<br>T-DAI=4 |

METHOD OF TRANSMITTING AND RECEIVING DOWNLINK DATA CHANNEL AND APPARATUS THEREFOR

CROSS-REFERENCE TO RELATED APPLICATIONS

This application is a continuation of U.S. application Ser. No. 16/376,510, filed on Apr. 5, 2019, now allowed, which claims the benefit of U.S. Provisional Application No. 62/653,532, filed on Apr. 5, 2018, and U.S. Provisional Application No. 62/670,024, filed on May 11, 2018. The disclosures of the prior applications are incorporated by reference in their entirety.

TECHNICAL FIELD

The present disclosure generally relates to a wireless communication system.

BACKGROUND

A new generation of wireless broadband communications, known as the 5$^{th}$-generation (5G), is being designed for telecommunication devices that demand increasing amounts of communication traffic. In this next generation 5G system, sometimes referred to as NewRAT, communication scenarios include Enhanced Mobile BroadBand (eMBB)/Ultra-reliability and low latency communication (URLLC)/Massive Machine-Type Communications (mMTC).

In particular, eMBB is a next generation mobile communication scenario having characteristics such as High Spectrum Efficiency, High User Experienced Data Rate, and High Peak Data Rate. URLLC is a next generation mobile communication scenario having characteristics such as Ultra Reliable, Ultra Low Latency, such as for vehicle-to-everything (V2X) communications, Emergency Service, and Remote Control. mMTC is a next generation mobile communication scenario with low cost, low energy, short packet, and massive connectivity, such as for Internet of Things (IoT).

SUMMARY

Implementations disclosed herein relate to transmitting and receiving downlink data channels.

One general aspect of the present disclosure includes a method of receiving a physical downlink shared channel (PDSCH) by a user equipment (UE) in a wireless communication system, the method including: receiving, in a first bandwidth part (BWP), a downlink control information (DCI) that includes (i) first information that indicates switching an active BWP from the first BWP to a second BWP, and (ii) second information related to scheduling at least one transport block (TB) for the PDSCH. The method also includes receiving, in the second BWP, the PDSCH based on the first information and the second information, where based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled. Other embodiments of this aspect include corresponding computer systems, apparatus, and computer programs recorded on one or more computer storage devices, each configured to perform the actions of the methods.

Implementations may include one or more of the following features. The method where the second information related to scheduling the at least one TB includes: a set of bits related to a modulation and coding scheme (MCS), a new data indicator (NDI), and a redundancy version (RV). The method where the information related to the second TB is zero-padded. The method where the information related to the second TB is ignored. The method where transmission configuration information (TCI) for the second BWP is same as TCI information related to the DCI. The method where the TCI information related to the DCI includes: TCI information for a control resource set (CORESET) that is related to the DCI. Implementations of the described techniques may include hardware, a method or process, or computer software on a computer-accessible medium.

Another general aspect includes an apparatus configured to receive a physical downlink shared channel (PDSCH) in a wireless communication system, the apparatus including: at least one processor; and at least one memory operably connectable to the at least one processor and storing instructions that, when executed by the at least one processor, perform operations including: receiving, in a first bandwidth part (BWP), a downlink control information (DCI) that includes (i) first information that indicates switching an active BWP from the first BWP to a second BWP, and (ii) second information related to scheduling at least one transport block (TB) for the PDSCH. The operations also include receiving, in the second BWP, the PDSCH based on the first information and the second information, where based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled. Other embodiments of this aspect include corresponding computer systems, apparatus, and computer programs recorded on one or more computer storage devices, each configured to perform the actions of the methods.

Implementations may include one or more of the following features. The apparatus where the second information related to scheduling the at least one TB includes: a set of bits related to a modulation and coding scheme (MCS), a new data indicator (NDI), and a redundancy version (RV). The apparatus where the information related to the second TB is zero-padded. The apparatus where the information related to the second TB is ignored. The apparatus where transmission configuration information (TCI) for the second BWP is same as TCI information related to the DCI. The apparatus where the TCI information related to the DCI includes: TCI information for a control resource set (CORESET) that is related to the DCI. Implementations of the described techniques may include hardware, a method or process, or computer software on a computer-accessible medium.

Another general aspect includes a user equipment (UE) configured to receive a physical downlink shared channel (PDSCH) in a wireless communication system, the UE including: a transceiver. The user equipment also includes at least one processor; and at least one memory operably connectable to the at least one processor and storing instructions that, when executed by the at least one processor, perform operations including: receiving, in a first bandwidth part (BWP), a downlink control information (DCI) that includes (i) first information that indicates switching an active BWP from the first BWP to a second BWP, and (ii) second information related to scheduling at least one transport block (TB) for the PDSCH. The operations also includes receiving, in the second BWP, the PDSCH based on the first information and the second information, where based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled. Other embodiments of this aspect include corresponding computer systems, apparatus, and computer programs recorded on one or more computer storage devices, each configured to perform the actions of the methods.

Another general aspect includes a method of transmitting a physical downlink shared channel (PDSCH) in a wireless communication system, the method including: transmitting, in a first bandwidth part (BWP), a downlink control information (DCI) that includes (i) first information that indicates switching an active BWP from the first BWP to a second BWP, and (ii) second information related to scheduling at least one transport block (TB) for the PDSCH. The method also includes transmitting, in the second BWP, the PDSCH based on the first information and the second information, where based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled. Other embodiments of this aspect include corresponding computer systems, apparatus, and computer programs recorded on one or more computer storage devices, each configured to perform the actions of the methods.

Another general aspect includes a base station (BS) configured to transmit a physical downlink shared channel (PDSCH) in a wireless communication system, the BS including: a transceiver. The base station also includes at least one processor; and at least one memory operably connectable to the at least one processor and storing instructions that, when executed by the at least one processor, perform operations including: transmitting, in a first bandwidth part (BWP), a downlink control information (DCI) that includes (i) first information that indicates switching an active BWP from the first BWP to a second BWP, and (ii) second information related to scheduling at least one transport block (TB) for the PDSCH. The operations also include transmitting, in the second BWP, the PDSCH based on the first information and the second information, where based on a number of TBs in a first group of TBs that can be scheduled through the second information being equal to one, and based on a number of TBs in a second group of TBs that can be scheduled for the second BWP being equal to two: among the second information related to scheduling the at least one TB, information related to a second TB among the second group of TBs is disabled. Other embodiments of this aspect include corresponding computer systems, apparatus, and computer programs recorded on one or more computer storage devices, each configured to perform the actions of the methods.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram showing an example of a control plane and a user plane structure of a wireless interface protocol between a terminal and an E-UTRAN based on the 3GPP radio access network standard;

FIGS. 12 to 14 are diagrams showing examples of HARQ-ACK transmission in Carrier Aggregation (CA);

DETAILED DESCRIPTION

Figure 2:
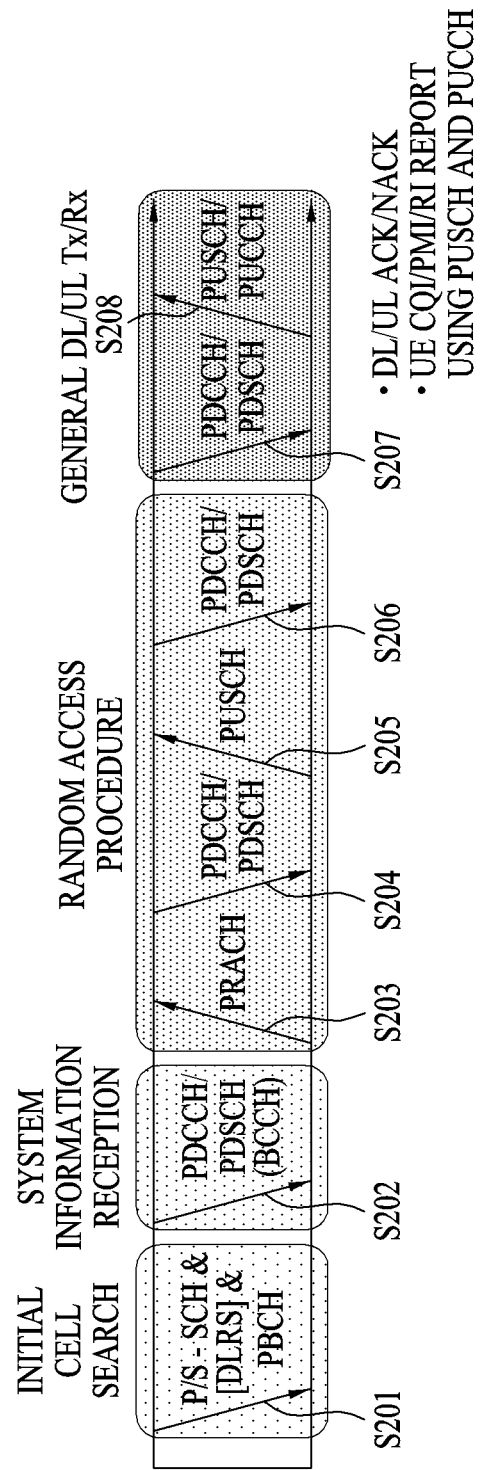
FIG. 2 is a diagram showing an example of a physical channel used in a 3GPP system and a general signal transmission method using the same.

Implementations disclosed herein enable transmitting and receiving a downlink data channel. In a fifth generation (5G) wireless communication system, a bandwidth part (BWP) may be changed dynamically, for example, to achieve improved energy savings and/or load balancing through RF/baseband switching. In addition, Hybrid Automatic Repeat reQuest Acknowledgment (HARQ-ACK) codebook configuration, CSI reporting, and the like can be changed based on the change of the BWP. In particular, when Carrier Aggregation (CA) is implemented using multiple BWPs, it may be necessary to define the HARQ-ACK codebook configuration and the CSI configuration method according to the change in BWP.

According to the present disclosure, when different BWPs use a semi-static HARQ-ACK codebook and a dynamic HARQ-ACK codebook, and use a transport block (TB)-based HARQ-ACK and a code block group (CBG)-based HARQ-ACK, implementations are disclosed herein that enable HARQ-ACK transmission in a case where HARQ-ACK transmission methods are different for each BWP. In addition, implementations disclosed herein enable a HARQ-ACK transmission method in the process of changing BWPs due to BWP switching. Implementations of the present disclosure are not limited to the scenario of HARQ-ACK transmission, and may be extended to other Uplink Control Information (UCI) transmissions, such as channel state information (CSI).

In some scenarios, a user equipment (UE) receives downlink control information (DCI) in a first BWP, and the DCI schedules a PDSCH reception in a second BWP, after a BWP change. Implementations are disclosed herein for interpreting the information contained in the DCI for transmitting and receiving the PDSCH.

According to the present disclosure, in some implementations, even when a first BWP before a BWP change is different from and a second BWP after the BWP change, implementations disclosed herein can provide stable transmission and reception of the downlink data channel without ambiguity.

Hereinafter, the structure, operation and other features of the present disclosure will be readily understood by the implementations of the present disclosure described with reference to the accompanying drawings. The implementations described below are examples in which technical features of the present disclosure are applied to a 3GPP system.

Although the present specification describes an implementation of the present disclosure using an LTE system, an LTE-A system, and an NR system, implementations of the present disclosure may be applied to any suitable communication system that is compliant with the above standards.

Also, although the present disclosure utilizes specific terminology such as a remote radio head (RRH), an eNB, a transmission point (TP), a reception point (RP), a relay, and the like, implementations of the present disclosure may be applied to more general systems that utilize analogous features.

3GPP-based communication standards typically include downlink physical channels corresponding to resource elements carrying information originating from an upper layer, as well as downlink physical signals used by the physical layer but corresponding to resource elements not carrying information originated from an upper layer.

For example, downlink physical channels may include a Physical Downlink Shared Channel (PDSCH), a Physical Broadcast Channel (PBCH), a Physical Multicast Channel (PMCH), a Physical Control Format Indicator Channel a physical downlink control channel (PDCCH), and a physical hybrid ARQ indicator channel (PHICH).

Downlink physical signals may include a reference signal and a synchronization signal. A reference signal (RS), also referred to as a pilot, refers to a signal of a particular and predetermined waveform that is known to the gNB and the UE. Examples of downlink reference signals include, for example, a cell specific RS, a UE-specific RS (UE-RS), a positioning RS (PRS), and channel state information RS (CSI-RS).

For uplink communications, 3GPP-based communication standards typically include uplink physical channels corresponding to resource elements carrying information originating from an upper layer, as well as uplink physical signals corresponding to resource elements used by the physical layer but not carrying information originated from an upper layer.

For example, uplink physical channels include a physical uplink shared channel (PUSCH), a physical uplink control channel (PUCCH), a physical random access channel (PRACH), a demodulation reference signal (DMRS) for the uplink control/data signal, and a sounding reference signal (SRS) used for the uplink channel measurement.

In the present disclosure, a Physical Downlink Control Channel (PDCCH), a Physical Control Format Indicator CHannel (PCFICH), a Physical Hybrid Automatic Repeat Request Indicator CHannel (PHICH), and a Physical Downlink Shared CHannel (PDSCH), a Physical Uplink Control CHannel (PUCCH), a Physical Uplink Control Channel (PUSCH), a Physical Uplink Control Channel (PUSCH), and a Physical Uplink Control Channel (PUSCH) (Uplink Shared CHannel)/PRACH (Physical Random Access CHannel) refers to a set of time-frequency resources or a set of resource elements that carry Downlink Control Information (DCI), Control Format Indicator (CFI), downlink ACKnowlegement/Negative ACK (DL ACK/NACK), and DL data.

Hereinafter, the expression that a user equipment (UE) transmits the PUCCH/PUSCH/PRACH is used in the same sense as to transmit the uplink control information/uplink data/random access signal on the PUSCH/PUCCH/PRACH, respectively. Also, the expression that a gNode B (gNB) transmits PDCCH/PCFICH/PHICH/PDSCH is used in the same sense as to transmit downlink data/control information on the PDCCH/PCFICH/PHICH/PDSCH, respectively. In the following description, an OFDM symbol/subcarrier/RE allocated with CRS/DMRS/CSI-RS/SRS/UE-RS is referred to as CRS/DMRS/CSI-RS/SRS/UE-RS symbol/carrier/sub-carrier/RE. For example, an OFDM symbol to which a tracking RS is allocated or configured is referred to a "TRS symbol," a sub-carrier to which a TRS is allocated or configured is referred to as a "TRS subcarrier," and a RE to which a TRS is allocated or configured is referred to as a "TRS RE." In addition, a subframe configured for TRS transmission is referred to as a "TRS subframe." A subframe in which a broadcast signal is transmitted is called a "broadcast subframe" or a "PBCH subframe," and a subframe in which a synchronization signal (for example, PSS and/or SSS) is transmitted is referred to as a "synchronization signal subframe" or a "PSS/SSS subframe." The OFDM symbols/subcarriers/REs to which PSS/SSS is configured or set are referred to as "PSS/SSS symbol/subcarrier/RE," respectively.

In the present disclosure, a CRS port, UE-RS port, CSI-RS port, and TRS port are respectively configured as an antenna port configured to transmit CRS, an antenna port configured to transmit UE-RS, an antenna port configured to transmit CSI-RS, and an antenna port configured to transmit TRS. The antenna ports configured to transmit CRSs can be distinguished from each other by the location of the REs occupied by the CRS according to the CRS ports, the antenna ports configured to transmit UE-RSs can be distinguished from each other by the location of the REs occupied by the UE-RS according to the UE-RS ports, and the antenna ports configured to transmit the CSI-RSs can be distinguished from each other by the positions of the REs occupied by the CSI-RS according to the CSI-RS ports. Therefore, the term CRS/UE-RS/CSI-RS/TRS port is also used as a term for a pattern of REs occupied by CRS/UE-RS/CSI-RS/TRS within a certain resource area.

FIG. 1 is a diagram illustrating an example of a control plane and a user plane structure of a radio interface protocol between a UE and an E-UTRAN based on the 3GPP radio access network standard. The control plane refers to a path through which control messages used by a UE and a network are transmitted. The user plane refers to a path through which data generated in the application layer, for example, voice data or Internet packet data, is transmitted.

The physical (PHY) layer, which is the first layer, provides an information transfer service to an upper layer using a physical channel. The physical layer is connected to the upper Medium Access Control (MAC) layer through a transmission channel (Transport Channel). Data moves between the MAC layer and the PHY layer over the transmission channel. Data is transferred between a transmitting side (e.g., transmitting device) and a receiving side (e.g., receiving device) at the physical layer through the physical channel. The physical channel utilizes time and frequency as radio resources. For example, the physical channel may be modulated according to Orthogonal Frequency Division Multiple Access (OFDMA) in a downlink, and may be modulated according to Single Carrier Frequency Division Multiple Access (SC-FDMA) an uplink.

The Medium Access Control (MAC) layer of the second layer provides a service to a radio link control (RLC) layer, which is an upper layer, through a logical channel. The RLC layer of the second layer supports reliable data transmission. In some implementations, the function of the RLC layer may be implemented as a functional block in the MAC. The Packet Data Convergence Protocol (PDCP) layer of the second layer performs a header compression function to reduce the amount of control information and efficiently transmit IP packets, such as IPv4 and IPv6 packets, in a wireless interface with a narrow bandwidth.

The Radio Resource Control (RRC) layer located at the bottom of the third layer is, in some implementations, defined only in the control plane. The RRC layer is responsible for the control of logical channels, transmission channels, and physical channels in connection with the configuration, re-configuration and release of radio bearers. A "radio bearer" refers to a service provided by the second layer for data transmission between a UE and a network. To this end, the terminal and the RRC layer of the network may exchange RRC messages with each other. If there is an RRC connection between the UE and the RRC layer of the network, then the UE is in an "RRC Connected Mode," and otherwise the UE is in an "RRC Idle Mode." The Non-Access Stratum (NAS) layer at the top of the RRC layer performs functions such as session management and mobility management.

A downlink transmission channel for transmitting data from a network to a terminal (e.g., a UE) includes, for example, a BCH (Broadcast Channel) for transmitting system information, a PCH (Paging Channel) for transmitting a paging message, a downlink SCH (Shared Channel) for transmitting user traffic and control messages. In the case of a traffic or control message of a downlink multicast or broadcast service, these messages may be transmitted through a downlink SCH, or may be transmitted via a separate downlink multicast channel (MCH). In some implementations, the uplink transmission channel for transmitting data from the UE to the network includes, for example, a RACH (Random Access Channel) for transmitting an initial control message, and an uplink SCH (Shared Channel) for transmitting user traffic or control messages. A logical channel mapped to a transmission channel includes, for example, a Broadcast Control Channel (BCCH), a Paging Control Channel (PCCH), a Common Control Channel (CCCH), a Multicast Control Channel (MCCH), and a Multicast Traffic Channel (MTCH).

FIG. 2 is a diagram showing an example of a physical channel used in a 3GPP system and a general signal transmission method using the same.

When the UE is turned on or newly enters a cell, the UE performs an initial cell search operation, such as synchronizing with the base station (BS) (S201). To this end, the UE receives a primary synchronization channel (P-SCH) and a secondary synchronization channel (S-SCH) from the BS, synchronizes with the BS, and acquires information such as a cell ID. Then, the UE can receive the physical broadcast channel from the BS and acquire the in-cell broadcast information. In some implementations, the UE can receive a downlink reference signal (DL RS) in the initial cell search step, to check the downlink channel state.

Upon completion of the initial cell search, the UE receives more detailed system information by receiving a Physical Downlink Control Channel (PDCCH), as well as a Physical Downlink Control Channel (PDSCH) according to the information on the PDCCH (S202).

In some implementations, if the US is connecting to a base station (BS) as an initial connection, or if there is no radio resource for signal transmission, then the UE can perform a random access procedure (RACH) for the BS (steps S203 to S206). To this end, the UE transmits a specific sequence through a Physical Random Access Channel (PRACH) as a preamble (S203 and S205), and receives a response message to that preamble on the PDCCH and the corresponding PDSCH (S204 and S206). In scenarios of contention-based RACH, a contention resolution procedure can be additionally performed.

The UE having performed the above procedure may then perform reception of PDCCH/PDSCH (S207), and transmission of physical uplink shared channel (PUSCH)/physical uplink control channel Control Channel (PUCCH) (S208). For example, the UE may receive downlink control information (DCI) through the PDCCH. In such scenarios, the DCI may include control information, such as resource allocation information for the UE, and the DCI formats may be different according to the purpose of use.

In some implementations, the control information transmitted by the UE to the Node B via the uplink or received from the Node B by the UE includes, for example, a downlink/uplink ACK/NACK signal, a channel quality indicator (CQI), a precoding matrix index (PMI), a rank indicator (RI), and the like. In some systems, e.g., those compatible with the 3GPP LTE standard, the UE may transmit control information such as CQI/PMI/RI as described above through PUSCH and/or PUCCH.

Figure 3:
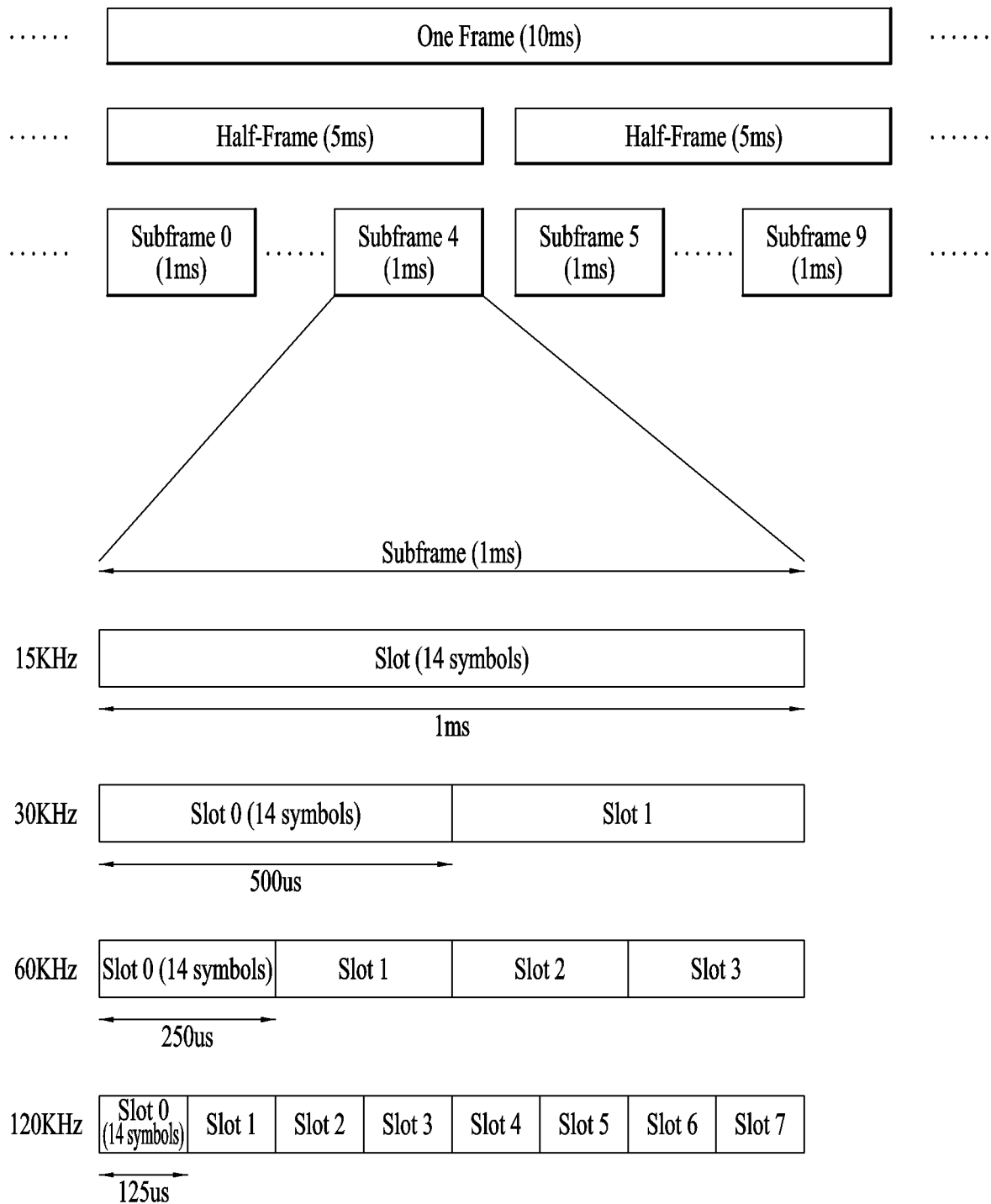
FIGS. 3 to 5 are diagrams showing examples of structures of radio frames and slots used in a wireless communication system.

FIG. 3 illustrates an example of the structure of a radio frame used in NR.

In NR, uplink and downlink transmission are composed of frames. The radio frame may have a length of 10 ms and may be defined as two 5-ms half-frames (HFs). Each half-frame may be defined as five 1-ms subframes (SFs). A subframe may be divided into one or more slots, and the number of slots in a subframe may depend on SCS (Sub-carrier Spacing). Each slot may include 12 or 14 OFDM(A) symbols according to a cyclic prefix (CP). In some implementations, if a CP is used, then each slot contains 14 symbols. If an extended CP is used, then each slot contains 12 symbols. The symbol may include, for example, an OFDM symbol (or a CP-OFDM symbol) and an SC-FDMA symbol (or a DFT-s-OFDM symbol).

Table 1 illustrates an example of a normal CP, where the number of symbols per slot, the number of slots per frame, and the number of slots per subframe are different according to the SCS.

TABLE 1

| SCS (15 * 2 ^ u) | $N^{slot}_{symb}$ | $N^{frame,u}_{slot}$ | $N^{subframe,u}_{slot}$ |
|---|---|---|---|
| 15 KHz (u = 0) | 14 | 10 | One |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 | where $N^{slot}_{symb}$ is the number of symbols per slot, $N^{frame,u}_{slot}$ is the number of slots per frame, and $N^{subframe,u}_{slot}$ is the number of slots per subframe.

Table 2 illustrates an example of extended CP, where the number of symbols per slot, the number of slots per frame, and the number of slots per subframe are different according to the SCS.

TABLE 2

| SCS (15 * 2 ^ u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerology (e.g., SCS, CP length, etc.) may be set differently among a plurality of cells for one UE. Accordingly, the (absolute time) interval of a time resource (e.g., SF, slot or TTI) (for convenience, TU (Time Unit)) composed of the same number of symbols can be set differently between merged cells.

Figure 4:
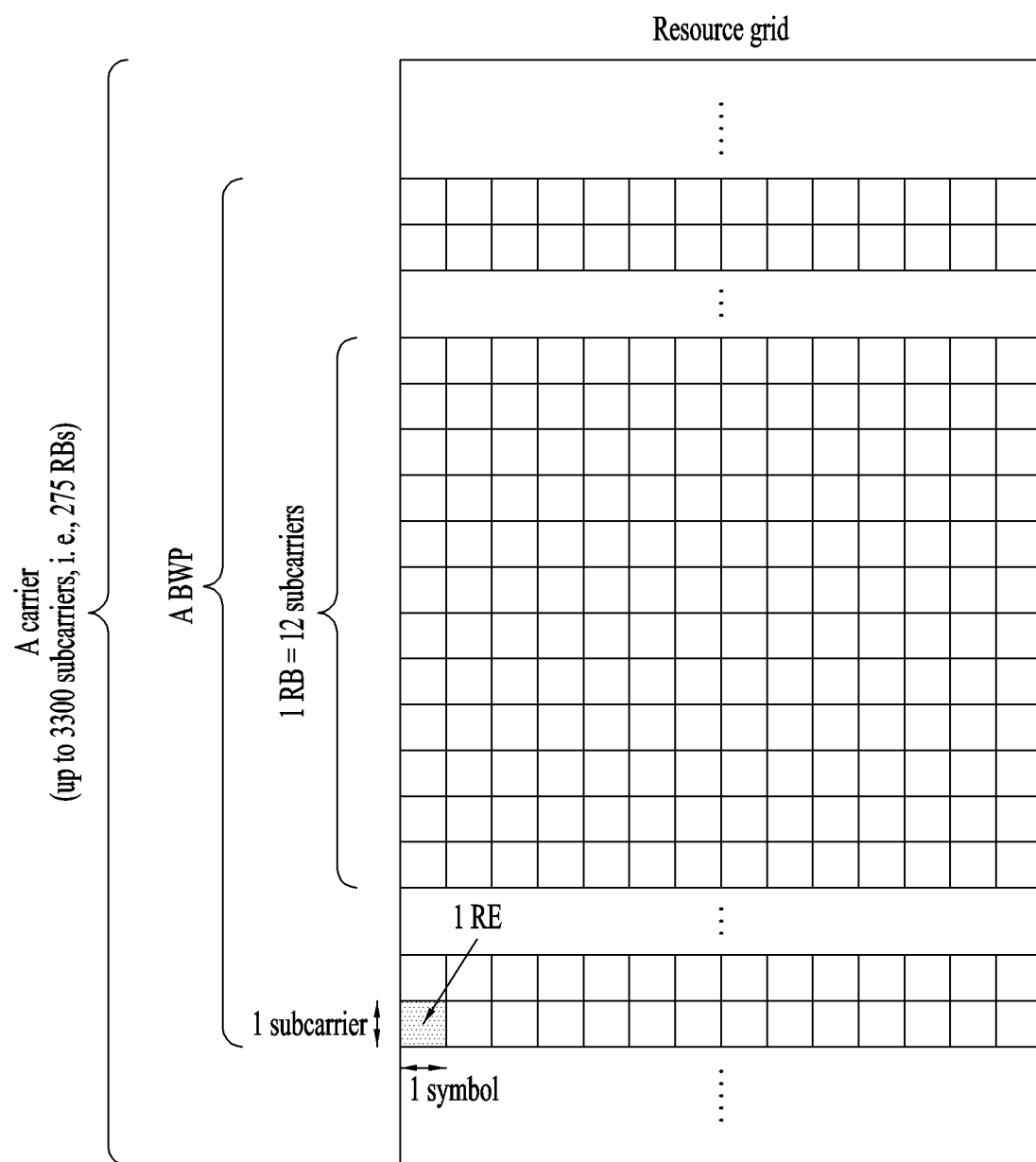

FIG. 4 illustrates an example of a slot structure of an NR frame. A slot includes a plurality of symbols in the time domain. For example, in the case of a normal CP, one slot includes seven symbols, whereas in the case of an extended CP, one slot includes six symbols.

A carrier wave includes a plurality of subcarriers in the frequency domain. An RB (Resource Block) is defined as a plurality (e.g., 12) of consecutive subcarriers in the frequency domain. A BWP (Bandwidth Part) is defined as a plurality of consecutive RBs (or physical RBs) in the frequency domain, and can correspond to one numerology (e.g., one SCS, one CP length, etc.). Each carrier may include up to N (e.g., 5) BWPs.

In some implementations, data communication is performed through an activated BWP, and only one BWP may be activated for one UE. In a resource grid representation, each element of the resource grid is referred to as a Resource Element (RE), to which one complex symbol can be mapped.

Figure 5:
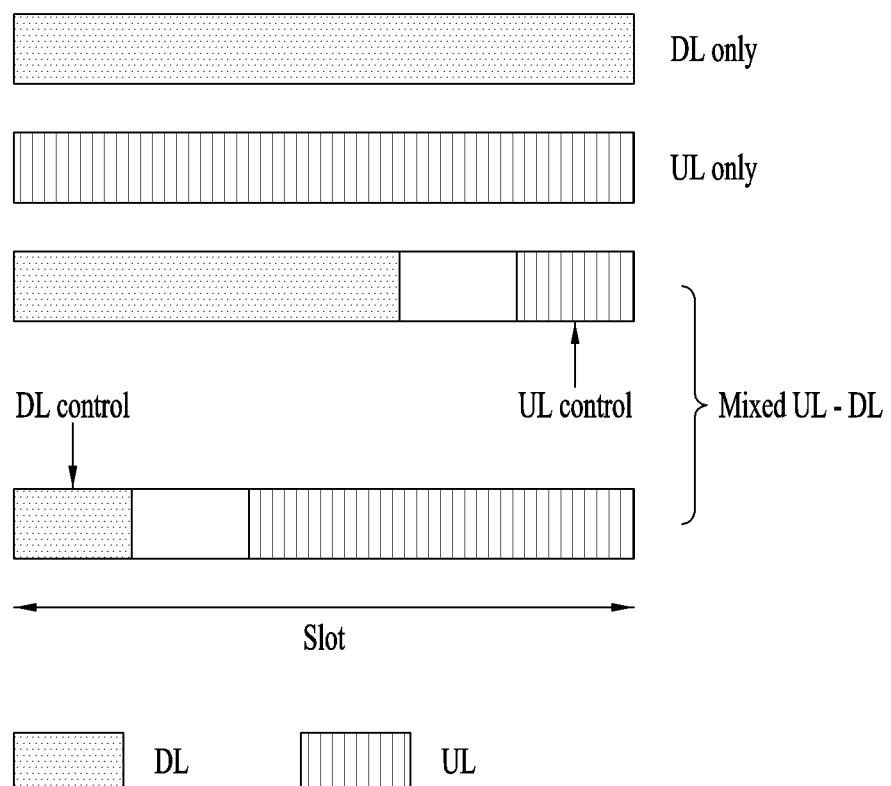

FIG. 5 illustrates an example of the structure of a self-contained slot. In an NR system, a frame is characterized by a self-contained structure in which a DL control channel, DL or UL data, a UL control channel, etc., can all be contained in one slot. For example, the first N symbols in a slot may be used to transmit a DL control channel (hereinafter referred to as a DL control area), and the last M symbols in a slot may be used to transmit UL control channels (hereinafter referred to as a UL control area). N and M may each be an integer of 0 or more.

A resource area (hereinafter referred to as a data area) between the DL control area and the UL control area may be used for DL data transmission or UL data transmission. For example, the following configuration may be implemented. Each section is listed in chronological order.

1. DL only configuration
2. UL only configuration
3. Mixed UL-DL configuration

DL area+Guard period (GP)+UL control area

DL control area+GP+UL area

DL area: (i) DL data area, (ii) DL control area+DL data area

UL area: (i) UL data area, (ii) UL data area+UL control area

The PDCCH may be transmitted in the DL control region, and the PDSCH may be transmitted in the DL data region. Analogously, in the UL control region, the PUCCH may be transmitted, and in the UL data region, the PUSCH can be transmitted. The PDCCH may transmit Downlink Control Information (DCI), such as, for example, DL data scheduling information, UL data scheduling information, and the like. The PUCCH may transmit Uplink Control Information (UCI), such as, for example, ACK/NACK information, DL CSI information, and Scheduling Request (SR), and the like.

The GP provides a time gap in the process of switching from a transmission mode to a reception mode, or switching from the reception mode to the transmission mode. A portion of symbols within a subframe can be set to GP for switching from DL to UL.

In some implementations, an NR system may utilize a high-frequency band, e.g., a millimeter-frequency band of 6 GHz or more, in order to transmit data while maintaining a high data rate for a large number of users in a wide frequency band. However, in such scenarios, the millimeter-frequency band may have a frequency characteristic in which the signal attenuation due to distance is very sharp due to the high-frequency nature of the band. Therefore, to compensate for such sudden attenuation characteristics, an NR system that utilizes at least a band of 6 GHz may transmit a signal beam in a specific direction, rather than in all directions, so as to transmit a narrow beam. In such scenarios where a service is performed using narrow beams, since a range of a single base station may be narrowed, the base station may collect a plurality of narrow beams and provide services over a wide band that encompasses the plurality of narrow beams.

In the millimeter frequency band, that is, in the millimeter wave (mmW) band, wavelengths are typically shortened, and this allows a plurality of antenna elements to be installed in the same area. For example, in a 30 GHz band with a wavelength of about 1 cm, a total of 100 antenna elements can be installed in a 5-by-5 cm panel in a two-dimensional array at 0.5 lambda (wavelength) intervals. Therefore, in mmW, coverage or throughput may be increased by increasing the beamforming gain through a plurality of antenna elements.

In some implementations, as a technique for forming a narrow beam in the millimeter frequency band, beam forming be may implemented in which energy is raised only in a specific direction by transmitting the same signal using an appropriate phase difference to a large number of antennas in a base station or a UE. Such beamforming schemes include (i) digital beamforming that creates a phase difference in a digital baseband signal, (ii) analog beamforming that creates a phase difference using a time delay (i.e., a cyclic shift) on the modulated analog signal, and (iii) hybrid beamforming using both digital beamforming and analog beamforming.

In scenarios where a transceiver unit (TXRU) is provided to enable transmission power and phase adjustment for each antenna element, then independent beamforming for each frequency resource may be implemented. However, problems may arise in that the TXRU may not be cost-effective in terms of installing numerous antenna elements of 100 or more. For example, a millimeter frequency band may require a large number of antennas to compensate for sudden attenuation characteristics. In such scenarios, digital beamforming may require a number of RF components (e.g., a digital-to-analog converter (DAC)), mixers, power amplifiers, linear amplifiers, and the like, in a number that is a many as the number of antennas. As such, digital beamforming in the millimeter frequency band may face problems in that the price of communication devices may increase.

Therefore, when a large number of antennas is required, such as in the millimeter frequency band, implementations may utilize analog beamforming or hybrid beamforming. In the analog beamforming scheme, a plurality of antenna elements are mapped to one TXRU and the direction of a beam is adjusted by an analog phase shifter. In some scenarios, such an analog beamforming scheme may have a disadvantage in that it can generate only one beam direction in the entire band, and may not be able to perform frequency selective beamforming (BF). Hybrid BF is an intermediate form of digital BF and analog BF, and has a number (e.g., B) of TXRUs that are fewer than the number (e.g., Q) of antenna elements. In the case of hybrid BF, the number of beams that can be transmitted at the same time may be limited to B or less, although scenarios may vary depending on the connection method of the B TXRUs and Q antenna elements.

As mentioned above, since digital beamforming performs signal processing on a digital baseband signal to be transmitted or received, it is possible to transmit or receive signals in various directions simultaneously using multiple beams. By contrast, since analog beamforming performs beamforming in the modulated state of an analog signal to be transmitted or received, it cannot simultaneously transmit or receive signals in a plurality of directions beyond the range covered by one beam.

In general, a base station communicates with a plurality of users (UEs) at the same time using a broadband transmission or a multi-antenna characteristic. When a base station uses analog or hybrid beamforming and forms an analog beam in one beam direction, the base station may only be able to communicate with users included in the same analog beam direction due to the characteristics of analog beamforming.

Implementations disclosed herein provide RACH resource allocation and resource utilization for a base station that may, in some scenarios, mitigate such constraint inconsistencies caused by analog beamforming or hybrid beamforming characteristics.

Figure 6:
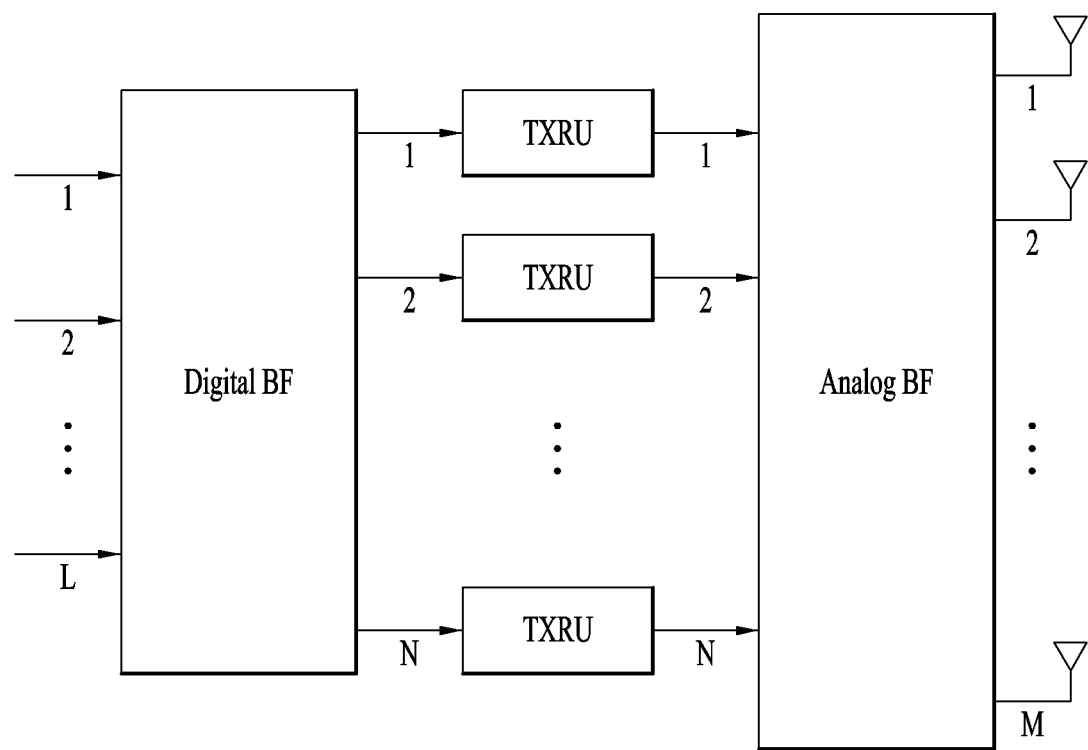
FIG. 6 is a diagram showing an example a hybrid beamforming structure in terms of a transceiver unit (TXRU) and a physical antenna.

FIG. 6 illustrates an example of a hybrid beamforming structure in terms of a transceiver unit (TXRU) and a physical antenna.

In scenarios where multiple antennas are utilized, a hybrid beamforming technique, which combines digital beamforming and analog beamforming, may be implemented. In analog beamforming (or RF beamforming), a transceiver (or an RF unit) performs precoding (or combining). In hybrid beamforming, a baseband unit and a transceiver (or RF unit) perform precoding (or combining), respectively. This may have the advantage of achieving performance that is close to digital beamforming, while reducing the number of RF chains and the number of D/A (or A/D) converters.

For convenience, the hybrid beamforming structure may be represented by N TXRUs and M physical antennas. Digital beamforming for L data layers to be transmitted at the transmitting end may be represented by an N-by-L matrix. The N converted digital signals may then be converted into analog signals via a TXRU, and then analog beamforming represented by an M-by-N matrix is applied.

In the example of FIG. 6, the number of digital beams is L and the number of analog beams is N. Further, in an NR system, a base station may be configured to change analog beamforming in units of symbols, and may thus provide more efficient beamforming for UEs located in a specific region. Furthermore, when N TXRU and M RF antennas are defined as one antenna panel, a plurality of antenna panels may be implemented to which independent hybrid beamforming is applicable in the NR system. When a base station utilizes a plurality of analog beams, an analog beam that is advantageous for signal reception may be different for each UE. Therefore, in some scenarios, such as for a synchronous signal, system information, paging, etc., a beam-sweeping operation may be implemented in which a base station changes multiple analog beams on a symbol-by-symbol basis for a specific slot or subframe, to provide reception opportunities to multiple UEs.

Figure 7:
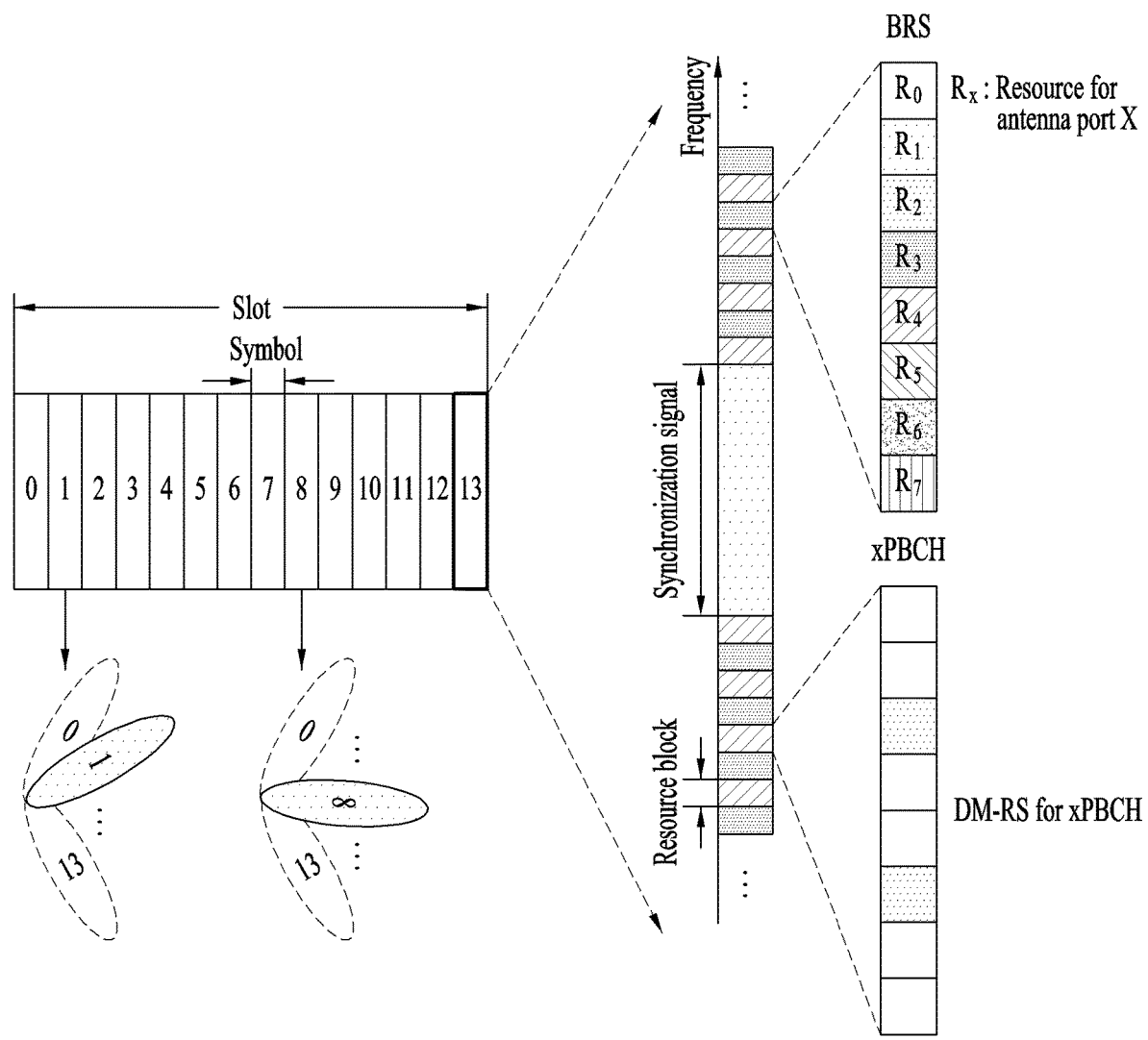
FIG. 7 is a diagram showing an example of a beam sweeping operation for a synchronization signal and system information in a downlink transmission process.

FIG. 7 is a diagram illustrating an example of a beam sweeping operation for a synchronization signal and system information in a downlink transmission process.

In the example of FIG. 7, a physical resource or a physical channel through which system information of the New RAT system is broadcast is referred to as xPBCH (physical broadcast channel). In some implementations, analog beams belonging to different antenna panels may be simultaneously transmitted within one symbol. In order to measure the channel for each analog beam, as shown in FIG. 7, implementations may utilize a Beam Reference Signal (BRS), which is a reference signal that is transmitted for a corresponding single analog beam. In some scenarios, a BRS may be defined for a plurality of antenna ports, and each antenna port of the BRS may correspond to a single analog beam. In some implementations, unlike the BRS, the synchronization signal or the xPBCH may be transmitted for all the analog beams included in the analog beam group, so that any UE can receive it well.

Figure 8:
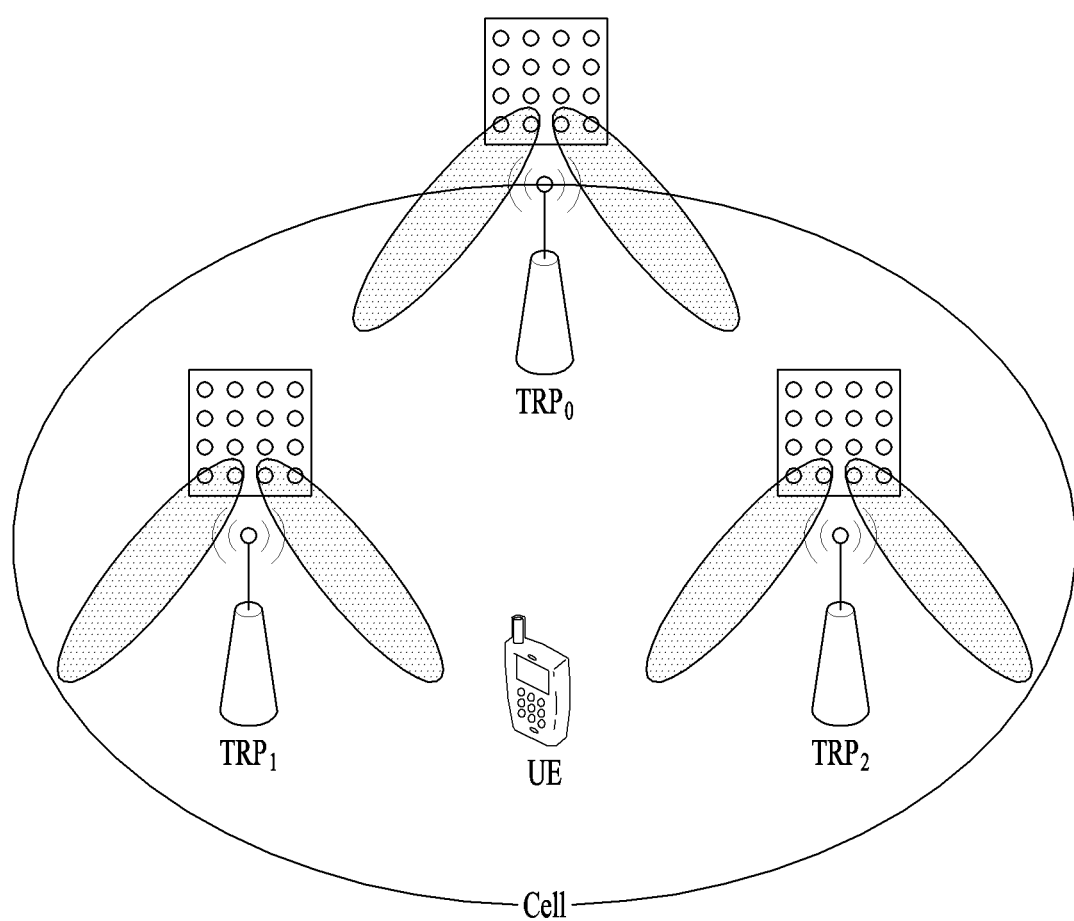
FIG. 8 is a diagram showing an example of a cell of a new radio access technology (NR) system.

FIG. 8 illustrates an example of a cell of a new radio access technology (NR) system.

Referring to the example of FIG. 8, in some scenarios, an NR system may implement a plurality of TRPs that constitute one cell, unlike a scenario where one base station forms one cell in a wireless communication system. In scenarios where a plurality of TRPs constitute one cell, even if the TRP for serving the UE is changed, there may be an advantage in that seamless communication can be provided and mobility management of the UE is facilitated.

In some systems, e.g., systems that are compatible with LTE/LTE-A, the PSS/SSS may be transmitted in an omni-direction. In some implementations, a gNB applying mmWave beam-forms a signal such as a PSS/SSS/PBCH while rotating the beam direction in an omnidirectional manner. The transmission/reception of signals while rotating the beam direction is referred to as "beam sweeping" or "beam scanning." In the present disclosure, beam sweeping refers to the transmitter-side behavior, and beam scanning refers to the receiver-side behavior.

For example, assuming that the gNB can have a maximum of N beam directions, the gNB may transmit signals (e.g., PSS/SSS/PBCH) across N beam directions, respectively. In other words, the gNB may transmit synchronization signals (e.g., PSS/SSS/PBCH) for each direction while sweeping directions that the gNB can implement or support. Alternatively, if the gNB can form N beams, then several beams may be bundled into one beam group, and the PSS/SSS/PBCH may be transmitted and/or received for each beam group. Each beam group may include one or more beams.

A signal (e.g., PSS/SSS/PBCH) that is transmitted in the same direction may be defined as one SS block, and a plurality of SS blocks may be implemented in one cell. In scenarios where there are a plurality of SS blocks, an SS block index may be utilized for distinguishing each SS block. For example, when a PSS/SSS/PBCH is transmitted in 10 beam directions in one system, then a PSS/SSS/PBCH in the same direction can constitute one SS block. In such a system, 10 SS blocks may be understood as being implemented. In the present disclosure, the beam index can be interpreted as an SS block index.

Bandwidth Part (BWP)

In some implementations, an NR system may support a per-carrier bandwidth of up to 400 MHz per carrier. If a UE operating on such a wideband carrier always operates with the radio frequency module turned-on for the entire carrier wave, then the UE's battery consumption may increase. Also, different usage scenarios (e.g., eMBB, URLLC, mMTC, V2X, etc.) operating within a single wideband carrier, different amplitudes (e.g., subcarrier spacing) may be supported for each frequency band within the corresponding carrier. Furthermore, the capability for the maximum bandwidth per UE may be different.

In consideration of these factors, a base station may instruct a UE to operate only in a part of the bandwidth, rather than over the entire bandwidth of the wideband carrier. The corresponding bandwidth in which the UE is instructed to operate is referred to as a "bandwidth part" (BWP). In the frequency domain, the BWP is a subset of contiguous common resource blocks defined for the numerology i in the bandwidth part i on the carrier, and one numerology (e.g., subcarrier spacing, CP length, slot/mini-slot duration) can be set.

In some implementations, a base station may configure one or more BWPs in one carrier wave configured for a UE. Alternatively, some UEs may be moved to another BWP for load balancing when multiple UEs overload a particular BWP. Alternatively, consideration may be given to frequency domain inter-cell interference cancellation between neighboring cells, and BWPs on both sides of the cell may be configured in the same slot by excluding some of the spectrums of the entire bandwidth.

For example, the base station may configure at least one DL/UL BWP to a UE associated with a wideband carrier, and activate at least one DL/UL BWP among DL/UL BWPs set at a specific point in time. The base station may instruct to switch to the BWP or configured the timer value so that the UE switches to the designated DL/UL BWP when the timer expires. As examples, the base station may transmit at least one DL/UL BWP of multiple DL/UL BWPs (e.g., by L1 signaling, MAC CE, or RRC signaling) or by switching to another configured DL/UL BWP (e.g., by L1 signaling, a MAC control element (CE) as a MAC layer control signal, or RRC signaling) to allow the UE to switch to a predetermined DL/UL BWP when the timer expires.

In some implementations, DCI format 1_1 or DCI format 0_1 may be used by the base station to instruct the UE to switch to another configured DL/UL BWP. The activated DL/UL BWP may be specifically referred to as the "active DL/UL BWP." If the UE is in an initial access procedure, or if the UE has not yet setup an RRC connection, then be UE may not receive the setting for the DL/UL BWP. In such situations, the DL/UL BWP assumed by the UE is called the initial active DL/UL BWP.

As used herein, the term "DL BWP" refers to a BWP for transmitting/receiving a downlink signal (e.g., PDCCH and/or PDSCH), and the term "UL BWP" refers to a BWP for transmitting/receiving an uplink signal (e.g., PUCCH and/or PUSCH).

Hybrid Automatic and the Repeat reQuest (HARQ)

HARQ-ACK operation with respect to UE operation for reporting control information will be described next. The HARQ-ACK is information indicating whether the UE has successfully received a physical downlink channel. If the UE has successfully received the physical downlink channel, then the UE sends an acknowledgment (ACK) feedback to the base station. If the UE does not successfully receive the physical downlink channel, then the UE sends a negative acknowledgment (NACK) feedback to the base station. The HARQ in NR supports one bit of HARQ-ACK feedback per transport block.

Figure 9:
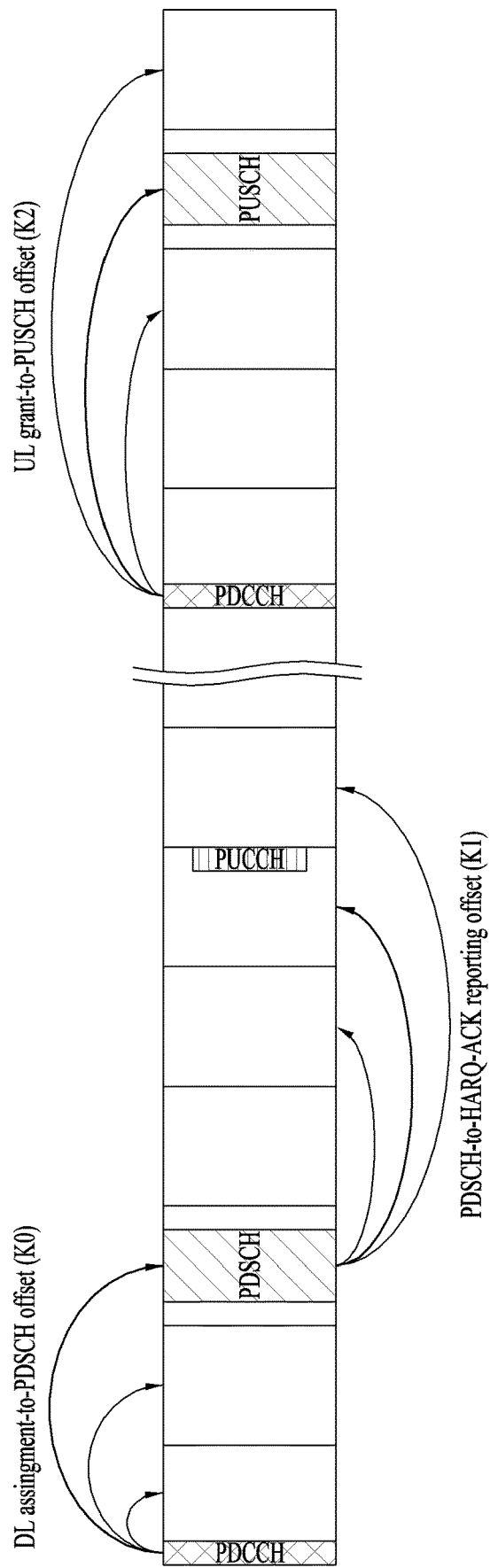
FIG. 9 is a diagram showing an example of HARQ-ACK timing in the NR system.

FIG. 9 is a diagram showing an example of the HARQ-ACK timing.

In the example of FIG. 9, K0 denotes the number of slots starting from the slot having the PDCCH carrying the DL allocation (i.e., the DL grant) to the slot having the corresponding PDSCH transmission. K1 denotes the number of slots starting from the slot of the PDSCH to the slot of the corresponding HARQ-ACK transmission. K2 denotes the number of slots starting from the slot having the PDCCH (carrying the UL grant) to the slot having the corresponding PUSCH transmission. That is, K0, K1, and K2 can be summarized as shown in Table 3 below.

TABLE 3

| | A | B |
| --- | --- | --- |
| K0 | DL scheduling DCI | Corresponding DL data transmission |
| K1 | DL data reception | Corresponding HARQ-ACK |
| K2 | UL scheduling DCI | Corresponding UL data transmission |

The base station can provide the UE with the HARQ-ACK feedback timing dynamically in DCI or semi-statically via RRC signaling.

In some implementations e.g., systems that are compatible with NR, different minimum HARQ processing times may be supported between UEs. The HARQ processing time includes the delay between the DL data reception timing and the corresponding HARQ-ACK transmission timing and the delay between the UL grant reception timing and the corresponding UL data transmission timing. The UE transmits, to the base station, information regarding the capability of its minimum HARQ processing time. From the UE point of view, HARQ ACK/NACK feedback for multiple DL transmissions in the time domain can be transmitted in one UL data/control domain. The timing between the reception of the DL data and the corresponding ACK is indicated by the DCI.

Unlike some systems (e.g., some systems that are compatible with LTE) in which the HARQ process is performed for each transport block or codeword, implementations disclosed herein (which may be compatible with NR) support transmission based on code block groups with single/multi-bit HARQ-ACK feedback. The transport block can be mapped to one or more CBs depending on the size of the TB. For example, in the channel coding process, a CRC code is attached to the TB. If the TB with the CRC is not larger than the predetermined size, the TB with the CRC corresponds to one code block. If the TB with the CRC is larger than the predetermined size, TB is segmented into a plurality of CBs. In the NR system, the UE may be configured to receive CBG-based transmissions, and the retransmission may be scheduled to carry a subset of all CBs of the TB.

Code Block Group (CBG)-Based HARQ Process

In some systems, such as those compatible with LTE, a transport block (TB)-based HARQ process is supported. In systems that are compatible with NR, a CBG-based HARQ process is supported with a TB-based HARQ process.

Figure 10:
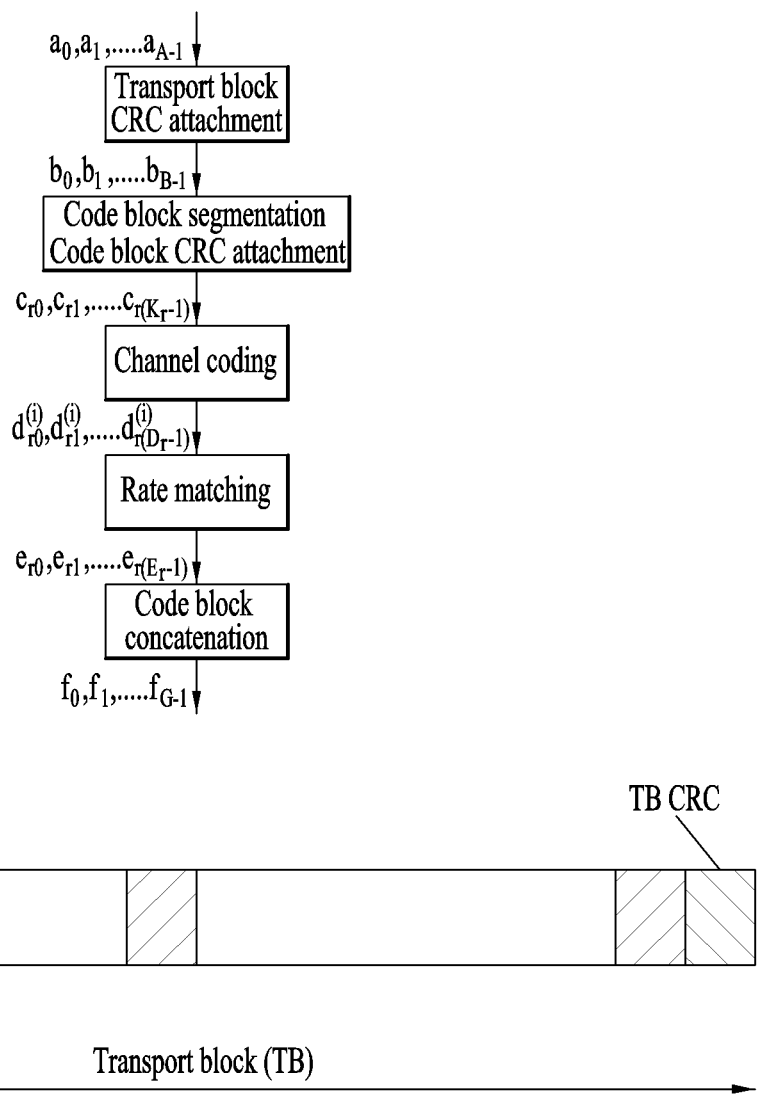
FIGS. 10 to 11 are diagrams showing examples of HARQ-ACK transmission in units of a code block group (CBG) in the NR system.

FIG. 10 illustrates an example of the processing and structure of TB. The example of FIG. 10 may be applied to data of a DL-SCH (Shared Channel), a PCH (Paging Channel), and an MCH (Multicast Channel) transmission channel. Furthermore, UL TB (or data on an UL transport channel) may be similarly processed.

Referring to the example of FIG. 10, the transmitter performs a CRC (e.g., 24-bit) (TB CRC) for error checking on the TB. Then, the transmitter can divide the TB+CRC into a plurality of code blocks considering the size of the channel encoder. In one example, the maximum size of a code block in LTE is 6144-bits. Therefore, if the TB size is equal to or less than 6144 bits, the code block is not formed. If the TB size is greater than 6144 bits, TB is divided into 6144-bit units to constitute a plurality of code blocks. In each code block, a CRC (e.g., 24-bit) (CB CRC) is added separately for error checking. Each code block is channel-coded and rate-matched, and then combines to form a codeword. In the TB-based HARQ process, the data scheduling and the HARQ process are performed on a TB basis, and the CB CRC is used to determine the early termination of the TB decoding.

Figure 11:
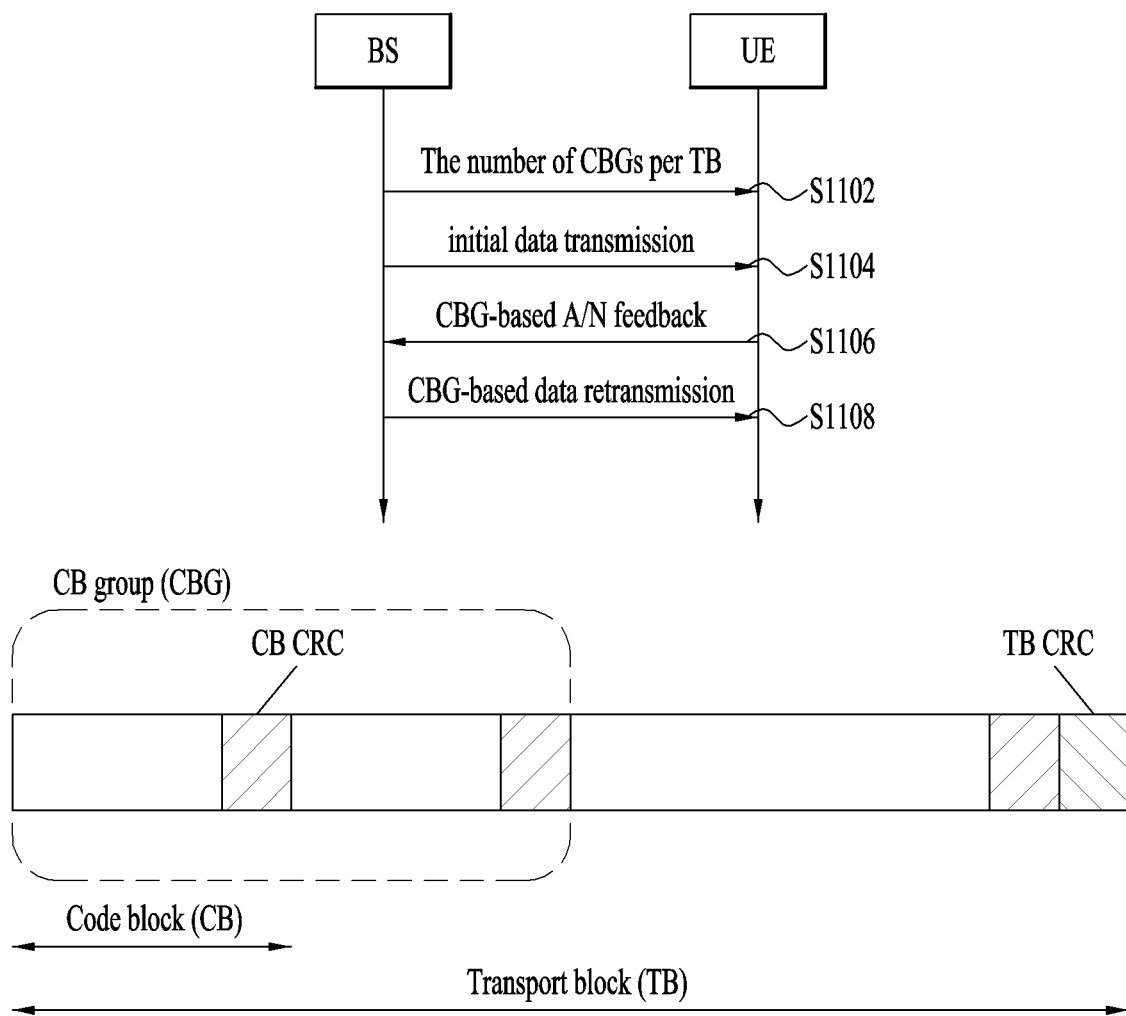
Figure 12:
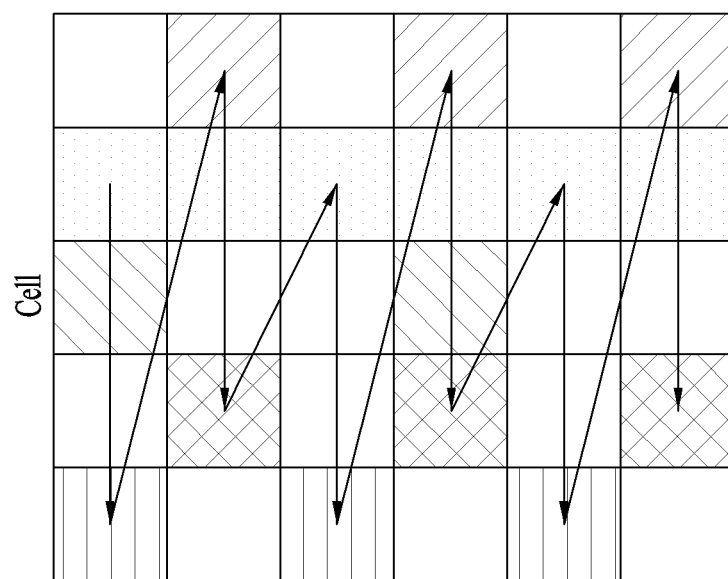

FIG. 11 illustrates an example of a CBG-based HARQ process. In the CBG-based HARQ process, the data scheduling and the HARQ process can be performed in TB units.

Referring to the example of FIG. 11, a UE may receive, from a base station (e.g., Node B), information regarding a number M of code block groups per transport block, and this information may be received through an upper layer signal (e.g., RRC signal) (S1102). Thereafter, the UE may receive initial data transmission (via the PDSCH) from the Node B (S1104). The data may include a transmission block (TB), and the TB may include a plurality of code blocks (CBs), and the plurality of CBs may be grouped into one or more code block groups (CBGs) within the TB. Here, some of the CBGs may include a number ceiling (K/M) of CBs, and the remaining CBs may include a number flooring (K/M) of CBs. The parameter K represents the number of CBs in the data.

Based on whether the UE correctly received the data, the UE can provide, as feedback, CBG-based ACK/NACK information regarding the data to the base station (S1106), and the base station can perform data retransmission of the data in units of CBGs (S1108). The A/N information may be transmitted via PUCCH or PUSCH. In some implementations, the A/N information includes a plurality of A/N bits for data, where each A/N bit represents each A/N response that is generated for each CBG. In some scenarios, the payload size of the A/N information may be kept the same based on M, regardless of the number of CBGs constituting the data.

Dynamic/Semi-Static HARQ-ACK Codebook Scheme

NR supports a dynamic HARQ-ACK codebook scheme and a semi-static HARQ-ACK codebook scheme. The HARQ-ACK (or A/N) codebook may be replaced with an HARQ-ACK payload.

When the dynamic HARQ-ACK codebook scheme is set, the size of the A/N payload varies depending on the number of actually scheduled DL data. To this end, the PDCCH associated with DL scheduling includes a counter-DAI (Downlink Assignment Index) and a total-DAI. The counter-DAI indicates the {CC, Slot} scheduling order value calculated in CC (Component Carrier) (or cell) -first manner and is used to designate the position of the A/N bit within the A/N codebook. The total-DAI indicates the cumulative value of slot-by-slot scheduling up to the current slot and is used to determine the size of the A/N codebook.

When the semi-static A/N codebook scheme is set, the size of the A/N codebook is fixed (at a maximum value) regardless of the actual number of scheduled DL data. Specifically, the (maximum) A/N payload (size) transmitted through one PUCCH in one slot is used for all CCs set to the UE and all the DL scheduling slots for which the A/N transmission timing can be indicated Or a combination of a PDSCH transmission slot or a PDCCH monitoring slot (hereinafter referred to as a bundling window). For example, the DL grant DCI (PDCCH) includes PDSCH-to-A/N timing information and the PDSCH-to-A/N timing information may have one of a plurality of values (e.g., k). For example, if the PDSCH is received in slot #m and the PDSCH-to-A/N timing information in the DL grant DCI (PDCCH) scheduling the PDSCH indicates k, then the A/N information for the PDSCH may be transmitted in slot # (m+k). For example, k being an element in the set {1, 2, 3, 4, 5, 6, 7, 8} can be given. On the other hand, when the A/N information is transmitted in the slot #n, then the A/N information may include the maximum A/N possible based on the bundling window. That is, the A/N information of the slot #n may include A/N corresponding to the slot # (n–k). For example, in the case of k being an element of the set {1, 2, 3, 4, 5, 6, 7, 8}, the A/N information of slot #n corresponds to A/N information of slot #(n–8) to slot #(n–1) (i.e., the maximum number of A/N). Here, the A/N information may be replaced with an A/N codebook and an A/N payload. Also, a slot can be understood/substituted as a candidate occasion for receiving DL data. As illustrated, the bundling window is determined based on the PDSCH-to-A/N timing with respect to the A/N slot and the PDSCH-to-A/N timing set has a predefined value (e.g., {1, 2, 3, 4, 5, 6, 7, 8}, and upper layer (RRC) signaling.

Hereinafter, a method for transmitting/receiving HARQ-ACK according to an implementation of the present disclosure will be described in detail.

In the 5th generation NR system, the bandwidth part (BWP) is changed dynamically, and may enable energy saving and/or load balancing through RF/baseband switching.

In addition, HARQ-ACK codebook configuration, CSI reporting, and the like can be changed based on the change of BWP. Particularly, when Carrier Aggregation (CA) is applied, BWP is independent It is necessary to define the HARQ-ACK codebook configuration and the CSI configuration method according to the change.

In the present disclosure, for example, when different BWPs use a semi-static HARQ-ACK codebook and a dynamic HARQ-ACK codebook, use a TB-based HARQ-ACK and a CBG-based HARQ-ACK, A HARQ-ACK transmission method in a case where HARQ-ACK transmission methods are different for each BWP will be described. In addition, a HARQ-ACK transmission method in the process of changing BWP through BWP switching will be described. Implementations of the present disclosure are not limited to HARQ-ACK transmission, and may be extended to other UCI transmissions such as CSI.

Basically, the HARQ-ACK feedback transmission method in the NR system includes a semi-static HARQ-ACK codebook scheme and a dynamic HARQ-ACK codebook scheme.

In the case of the semi-static HARQ-ACK codebook scheme, considering all the PDCCH monitoring occasions associated with a specific PUCCH transmission time, considering the plurality of PDSCH-to-HARQ-ACK feedback timings set for the UE, HARQ—The UE can process NACKs for PDSCH (Physical Downlink Shared Channel) that is not scheduled in the PDCCH monitoring occasions.

Among the PDSCH reception occasions that can expect reception of a PDSCH in a plurality of slots based on a PDSCH-to-HARQ-ACK feedback timing associated with a specific PUCCH transmission time point (i.e., a HARQ-ACK transmission time point), PDSCH reception occasions other than PDSCH reception occasions that cannot be scheduled by the PDCCH among the PDSCH reception occasions, i.e., PDSCH reception opportunities other than the PDSCH reception opportunity that cannot be scheduled by the PDCCH, are referred to as "candidate PDSCH reception opportunities.".

Among the candidate PDSCH reception occasions, the candidate PDSCH reception occasions that are not scheduled by the actual PDCCH monitoring occasions and have not received the PDSCH can be processed as NACK.

In some implementations, in the case of the dynamic HARQ-ACK codebook scheme, the total DAI field and/or the counter DAI field is set in the DCI, and generate/transmit HARQ-ACK bits for the PDSCH that is actually scheduled by the PDCCH monitoring opportunities based on the corresponding DAI value.

In some implementations, when carrier aggregation is applied, HARQ-ACK transmission for a plurality of cells can be multiplexed to one PUCCH and transmitted.

In this case, when the semi-static HARQ-ACK codebook is used, the order of the HARQ-ACK bits is the order of the PDCCH monitoring opportunities from the earliest in time, based on the union of the PDCCH monitoring opportunities of each cell. When a dynamic HARQ-ACK codebook is used, as shown in FIG. 13, when a DCI that schedules a PDSCH in a corresponding cell actually exists, the HARQ-HARQ-ACK can be generated based on this.

In some implementations, such as those compatible with NR, CBG-based retransmission and/or HARQ-ACK feedback can be set for each serving cell, and the number of CBG-based HARQ-ACK bits and/or maximum CBG-based HARQ-ACK bits can be set for each serving cell. If a semi-static HARQ-ACK codebook is used, it is necessary to generate a TB-based HARQ-ACK for each PDCCH monitoring occasion according to whether a CBG-based HARQ-ACK is set for each cell or a number of CBGs and/or a maximum number of CBGs based on the CBG-based HARQ-ACK bit. In some implementations, the TB-based HARQ-ACK can be generated with 1 bit or 2 bits according to the maximum number of TBs.

Figure 14:
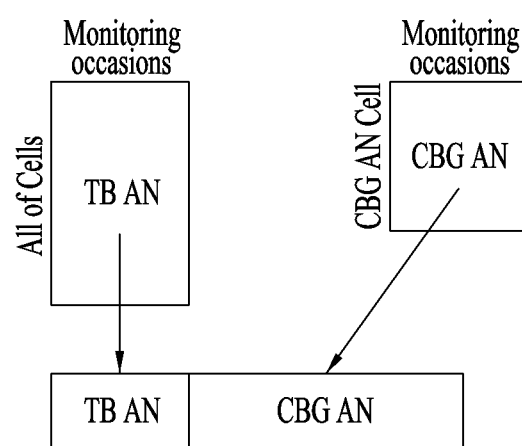

In the case of using a dynamic HARQ-ACK codebook, as shown in FIG. 14, HARQ-ACK bits are generated based on the TB-based HARQ-ACK for all serving cells, in addition to the serving cells for which CBG transmission is set, the number of CBGs to be scheduled for each serving cell is generated based on the maximum value of the number of CBGs set in each serving cell. In some implementations, the maximum value of the number of CBGs may be two times the maximum number of TBs set. On the other hand, in some systems (e.g., systems that are compatible with NR), the downlink and uplink signals (for example, subcarrier intervals) may be different. Therefore, when determining the timing between the PDSCH and the HARQ-ACK feedback, it is necessary to consider the difference in the signaling for the HARQ-ACK transmission and the feedback for the PDSCH. Basically, K1 representing the offset value between the PDSCH and the PUCCH to which the HARQ-ACK is transmitted is expressed based on the numerology of the PUCCH. Therefore, if the slot where the last symbol of the PDSCH overlaps is n, the PUCCH is transmitted in the slot corresponding to n+K1. However, if the sub-carrier interval of the PDSCH is smaller than the sub-carrier interval of the PUCCH, the slot based on the sub-carrier interval of the PUCCH may be different according to the time-domain resource allocation (time-domain RA) of the time domain.

In this case, a set of row of time-domain RA tables for a plurality of PDSCH-to-HARQ feedback timings in which the last symbol of the PDSCH in each PUCCH slot overlaps can be set. More specifically, the last symbol of the PDSCH can be derived from the SLIV of the time-domain RA field. In this case, the last symbol of the PDSCH can be set to be limited to the last slot of the aggregated slots in consideration of slot aggregation. Alternatively, the maximum value of the number of PDSCH (non-overlapping PDSCH) combinations that do not overlap between the PDSCHs can be set.

On the other hand, if the subcarrier interval of the PDSCH is larger than the subcarrier interval of the PUCCH, a plurality of slots for the PDSCH may overlap with one slot based on the subcarrier interval of the PUCCH. In this case, the HARQ-ACK codebook can be calculated based on the maximum number of PDSCHs (non-overlapping PDSCHs) that do not overlap each slot. Specifically, a set for all PDSCH slots overlapping a specific PUCCH slot is set, a maximum value of the number of PDSCH (non-overlapping PDSCH) combinations that do not overlap for each PDSCH slot is set and added, and another PDSCH-to-HARQ feedback timing can be repeatedly applied. In this case, considering the slot aggregation, the implementation can be applied only to the last slot of the aggregated slot.

By integrating the above-mentioned methods, the following implementations may be derived. For example, if the PUCCH is transmitted in the PUCCH slot n, it can constitute a set of SLIV and PDSCH slot combinations for all PDSCHs in which the last symbol overlaps the PUCCH slot n–k (where k is all values included in K1). In some implementations, if slot aggregation is set, the last symbol may be the last symbol corresponding to the last slot among the aggregated slots. The combination of SLIV and PDSCH slots including uplink symbols in the set for SLIV and/or PDSCH slot combination for all PDSCHs in which the last symbol overlaps can be excluded from the corresponding set. If the PDCCH monitoring occasion corresponding to the SLIV and PDSCH slot combination is not set, the corresponding SLIV and PDSCH slot combination may be excluded from the corresponding set. The maximum number of non-overlapping PDSCH combinations can be derived by applying an algorithm for finding non-overlapping PDSCHs within the determined set by performing the above-described procedure. At this time, the maximum number of combinations can be derived for each PDSCH slot, and if the slot aggregation is used, the derivation method can be modified.

On the other hand, PDCCH monitoring occasion may be different for each DCI format. For example, the PDCCH monitoring occasion of DCI format 1_0 may be composed of a subset of PDCCH monitoring occasions of DCI format 1_1. In this case, the time-domain resource allocation set may be different according to the DCI format.

Therefore, the HARQ-ACK codebook configuration scheme can be made different according to the DCI format. For example, if only the DCI format 1_1 is considered by the PDCCH monitoring occasion, then the HARQ-ACK codebook can be configured based on the rows of the time-domain RA table that can be indicated in the DCI format 1_1. On the other hand, when DCI format 1_1 and DCI format 1_0 can be monitored by PDCCH monitoring occasion, the rows of time-domain RA table which can be indicated in DCI format 1_1 and the rows of time the HARQ-ACK codebook can be constructed based on the union of the -domain RA tables.

For example, a set of PDSCH time-domain RA table rows and DCI format pair (format pair) can be set. For example, when the availability of the PDCCH is determined for each row, the PDCCH monitoring occasion of the DCI format paired with the corresponding row can be checked to set the corresponding set. That is, PDCCH monitoring occasions of the DCI format are confirmed based on the offset value K0 between the slots for receiving the PDSCH from the slot in which the DCI is received when checking each row of the time-domain RA table. If there is a PDCCH monitoring occasion at that point in time, it can be considered when constructing a HARQ-ACK codebook, and otherwise excluded from the HARQ-ACK codebook configuration.

On the other hand, the UE can perform PDCCH monitoring only within the currently active DL BWP. In some implementations, CORESET and/or search space may be independently set for each BWP. The search space may include monitoring occasions on the time axis for the PDCCH.

However, if the PDCCH monitoring occasions differ according to the BWP, the HARQ-ACK codebook configuration may also have to be changed dynamically. Also, the value range of the PDSCH-to-HARQ-ACK feedback timing can be set independently for each BWP, and the HARQ-ACK codebook configuration can be changed even in this case.

When the BWP is changed, an interval in which the HARQ-ACK codebook configuration is ambiguous may occur. For example, when a plurality of PDCCH monitoring opportunities associated with a HARQ feedback time point of a pre-change BWP and a plurality of PDCCH monitoring opportunities associated with a HARQ feedback time point of a post-change BWP overlap, there may be ambiguity in the HARQ-ACK codebook configuration in the overlapping PDCCH monitoring opportunities.

In some implementations, the bits configuring the HARQ-ACK codebook size or the HARQ-ACK codebook may be variously changed according to circumstances. For example, a PDSCH-to-HARQ-ACK timing set is set in {4, 5, 6, 7} slots in BWP # (timing set) is set in {4, 6} slots.

For example, when transmitting HARQ-ACK feedback in slot n, it is assumed that it operates in BWP #1 until slot n−4 and operates as BWP #2 in slot n−4. In this case, the UE may be ambiguous whether to transmit a 4-bit HARQ-ACK for slots n−7, n−6, n−5, and n−4 and/or a 2-bit HARQ-ACK for slots n−6 and n−4 in slot n. In particular, considering the CA situation, the overall HARQ-ACK codebook configuration may need to be changed as the size of the HARQ-ACK changes. However, the PDSCH-to-HARQ-ACK timing aggregation relationship according to the above assumption may be extended by combining according to the PDCCH-to-PDSCH timing.

Now, more specific implementations of a HARQ-ACK codebook construction method according to BWP switching will be described.

First, the operation procedure of the UE, the BS, and the network according to the implementation of the present disclosure will be described with reference to FIGS. 15 to 17.

Figure 15:
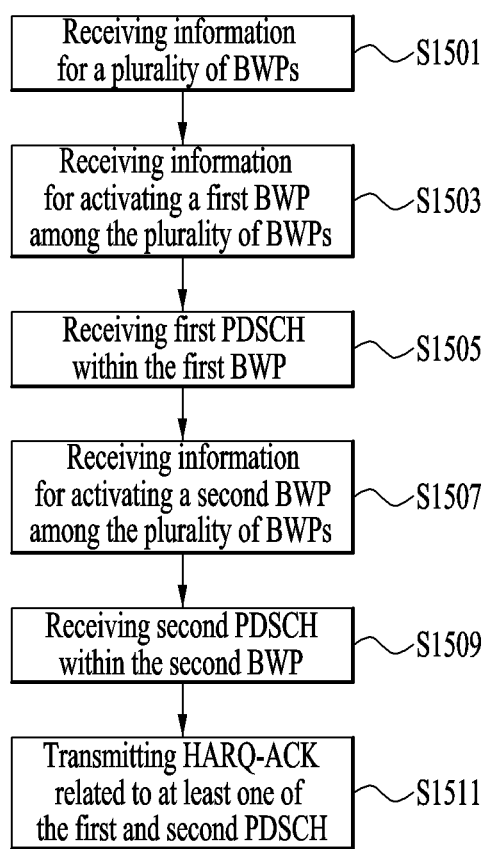
FIGS. 15 to 17 are diagrams showing examples of operations of a terminal, a BS, and a network for transmitting and receiving HARQ-ACK according to implementations of the present disclosure.

FIG. 15 is a flowchart illustrating an example of an operation of a UE according to an implementation of the present disclosure. Referring to FIG. 15, the UE may receive a plurality of BWPs for receiving a downlink signal from a base station (S1501). In some implementations, the plurality of BWPs may be set through upper layer signaling. Then, the UE receives, from the base station, DCI and/or higher layer signaling for activating the first BWP among the plurality of BWPs (S1503), and receives the first PDSCH through the activated first BWP (S1505). Thereafter, the UE receives, from the base station, DCI for changing the active BWP from the first BWP to the second BWP (S1507), and receives the second PDSCH through the second active BWP (S1509).

Then, the UE transmits HARQ-ACK for at least one of (i) the first PDSCH received through the BWP before change or (ii) the second PDSCH received through the changed BWP (S1511). In some implementations, the method of configuring the HARQ-ACK and a method of transmitting can be performed according to Implementations 1 to 4, described further below.

Figure 16:
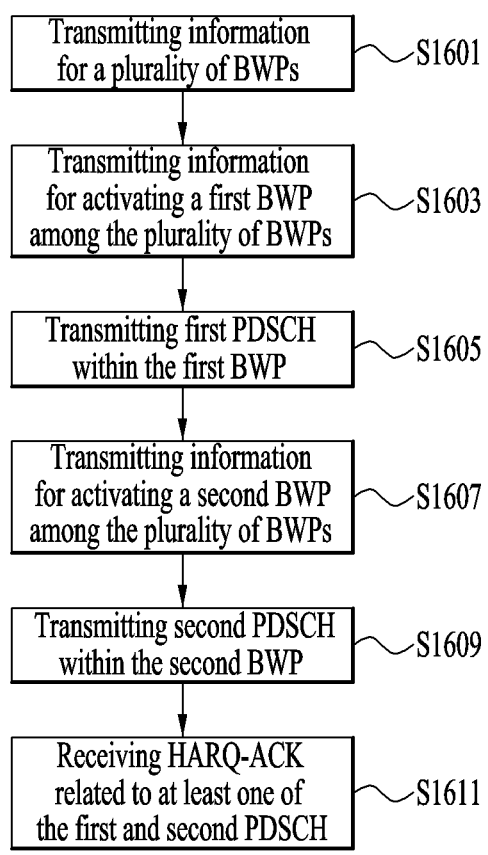

Referring to FIG. 16, an example of an operation of a base station according to an implementation of the present disclosure will be described. In operation S1601, a base station may configure a plurality of BWPs for downlink signal transmission to a UE. In some implementations, the plurality of BWPs may be configured through higher layer signaling. The base station transmits, to the UE, the DCI and/or higher layer signaling for activating the first BWP among the plurality of BWPs (S1603), and transmits the first PDSCH through the activated first BWP (S1605). Thereafter, the base station transmit, to the UE, the DCI for changing the active BWP from the first BWP to the second BWP (S1607), and transmits the second PDSCH through the second active BWP (S1609).

The base station receives from the UE an HARQ-ACK for at least one of (i) the first PDSCH transmitted through the BWP before change, or (ii) the second PDSCH transmitted through the changed BWP (S1611). In some implementations, the HARQ-ACK is configured and a receiving method according to the first to fourth implementations to be described further below.

Figure 17:
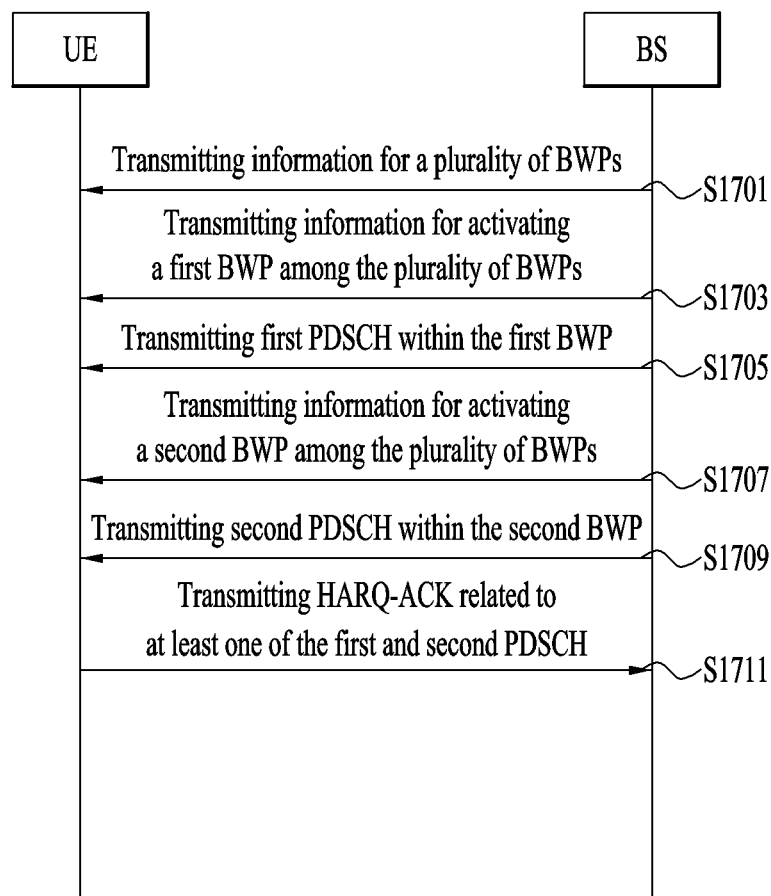

Considering the operations of FIGS. 15 and 16 from the network perspective in FIG. 17, the base station configures a plurality of BWPs for downlink signal transmission to the UE through upper layer signaling (S1701), transmits the BWPs of the plurality of BWPs, and transmits the DCI and/or higher layer signaling for activating the first BWP to the UE (S1703). Then, the base station transmits the first PDSCH through the activated first BWP (S1705). Then, the base station transmits the DCI for changing the active BWP from the first BWP to the second BWP to the UE (S1707), and transmits the second PDSCH through the second active BWP (S1709).

The UE transmits, to the base station, HARQ-ACK for at least one of (i) the first PDSCH that was transmitted through the BWP before the BWP change, or (ii) the second PDSCH that was transmitted through the BWP after the BWP change (S1711). In some implementations, the UE configures the HARQ-ACK and a receiving method according to the first to fourth implementations to be described further below.

Implementation 1

When using a semi-static HARQ-ACK codebook, a UE does not expect the BWP to change. Alternatively, the UE may expect that the PDCCH monitoring occasion set or the DL association set associated with the HARQ-ACK feedback is not changed even if the BWP is changed.

In some scenarios, in the case of the first implementation, it is possible to avoid or expect not to change the HARQ-ACK codebook configuration even though the BWP is changed.

Implementation 2

When a plurality of BWPs are set, the UE determines whether HARQ-ACK bits are generated based on a combination of downlink association sets or PDCCH monitoring occasions for all the set BWPs for each cell. Specifically, when a semi-static HARQ-ACK codebook is used, HARQ-ACK bits can be generated for each PDCCH monitoring occasion for all the BWPs set or for each PDCCH monitoring occasion in the union of downlink association sets. In this case, the number of HARQ-ACK bits may be one bit or two bits, depending on the number of TBs.

On the other hand, when the dynamic HARQ-ACK codebook is used, HARQ-ACK bits can be generated according to scheduling of the PDSCH based on the combination of the PDCCH monitoring occasions or the downlink association set for all the BWPs set.

In the second implementation, the number of HARQ-ACK bits can be increased. In particular, in the semi-static HARQ-ACK codebook, the number of HARQ-ACK bits may be excessively large. However, even when the BWP is changed dynamically and the PDCCH monitoring occasion, the PDCCH-to-PDSCH timing, and/or the PDSCH-to-HARQ-ACK feedback timing set are changed dynamically, the HARQ-ACK configuration does not change.

Implementation 3

The UE may generate HARQ-ACK bits based on the active BWP, i.e., active (downlink) BWP, at the corresponding HARQ-ACK feedback transmission time point. Alternatively, HARQ-ACK bits may be generated based on the (downlink) BWP corresponding to the PDSCH closest to the viewpoint among the PDSCHs associated with the HARQ-ACK feedback.

Specifically, in the case of a single cell based, the HARQ-ACK for the PDSCH that is being scheduled in the previous BWP can be dropped without being transmitted. In other words, when the UE configures the HARQ-ACK after the BWP is changed, the HARQ-ACK bit for the PDCSH scheduled in the BWP after the change is included in the HARQ-ACK configuration, and the HARQ-ACK for the PDSCH scheduled in the previous BWP-ACK bits can be transmitted without being included in the HARQ-ACK configuration.

On the other hand, in the CA situation, the order between HARQ-ACK bits for a plurality of serving cells may be rearranged, so that encoding for HARQ-ACK feedback may need to be performed again.

However, such a problem can be avoided by setting the interval in which the BWP is changed to be long enough and not performing new (downlink) scheduling within the interval. Or, it can be expected that the HARQ-ACK feedback for scheduling (downlink) occurring in the interval between BWP switching, that is, in the BWP switching is all scheduled to correspond to the BWP before the change or correspond to the BWP after the change.

In the case of the third implementation, HARQ-ACK feedback detection performance can be improved by generating as many HARQ-ACK bits as necessary. In particular, in the case of the semi-static HARQ-ACK codebook, it is possible to generate as many HARQ-ACK bits as necessary.

Specifically, in the case of semi-static HARQ-ACK codebook, in generating the HARQ-ACK bit number, the HARQ-ACK bit associated with the PDCCH monitoring occasions for the BWP before the change is not generated, only HARQ-ACK bits associated with the PDCCH monitoring occasions can be generated. That is, the number of HARQ-ACK bits is a number of candidate PDSCH opportunities that can expect reception of the PDSCH in a plurality of slots according to the PDSCH-to-HARQ feedback timing related to the HARQ-ACK feedback, and generate HARQ-ACK bits as many as the number of candidate PDSCH opportunities associated with the changed BWP.

In other words, the number of HARQ-ACK bits after BWP switching is performed may be less than the number of HARQ-ACK bits when BWP switching is not performed. However, after a certain period of time since the BWP switching is performed, all candidate PDSCH opportunities related to the HARQ-ACK feedback may be present in the slots after the BWP change. As time passes after the BWP change, the number of ACK bits may gradually increase. In other words, bits for candidate PDSCH opportunities associated with the pre-change BWP that are dropped on the HARQ-ACK bits are not included.

Implementation 4

When the UE determines that all the downlink BWPs indicated by the PDCCH scheduling PDSCH in the downlink association set corresponding to the HARQ-ACK feedback are all the same or when the PDCCH monitoring occasion set or HARQ-ACK feedback is used, the UE determines that the downlink association set is the same.

For example, the downlink association set for HARQ-ACK feedback at one point may correspond to only one specific BWP for each cell. Different HARQ-ACK feedback may be performed in different Orthogonal Cover Code (OCC) and frequency/symbol regions when HARQ-ACK feedback is divided into ACK/NACK resource indicator (ART). For each different HARQ-ACK feedback, the BWPs associated with the downlink association set may be individually set.

In this case, a fallback operation may be implemented within the BWP switching period. For example, in some implementations (e.g., in an NR system), the UE receives only one fallback DCI such as DCI format 1_0, and when the DAI value of the received fallback DCI is 1, it can transmit only HARQ-ACK bits for the corresponding DCI.

In some implementations, the fallback DCI may be transmitted in a common search space. In addition, when the UE detects PDCCH and/or PDSCH in the first slot or first PDCCH monitoring occasions in the downlink association set associated with HARQ-ACK in the NR system, the UE may transmit only HARQ-ACK bits for the corresponding PDSCH.

Alternatively, the BWP switching may be directed to the non-fallback DCI, so that if the UE detects only one DCI with DAI=1, then regardless of the DCI format, it may only transmit HARQ-ACK bits for that PDSCH. In this case, the DCI with DAI=1 may be a DCI scheduling the corresponding PDSCH. Specifically, even if only one DCI with DAI=1 is transmitted in SCell, i.e., DCI with DAI=1 is not transmitted in another cell, the HARQ-ACK bits for the corresponding PDSCH can be transmitted.

However, in case of using the semi-static HARQ-ACK codebook, there may be no DAI field for the non-fallback DCI, and thus the PDSCH is scheduled in the first PDCCH monitoring occasion corresponding to the downlink association set for HARQ—Only when the PDCCH is detected, the HARQ-ACK bit for the PDSCH can be transmitted. That is, even if the semi-static HARQ-ACK codebook is set, HARQ-ACK bits for all PDCCH monitoring occasions associated with the HARQ-ACK feedback are not generated but HARQ-ACK bits related to the DCI-based fallback operation with DAI=Can be generated. At this time, during the BWP switching period, the UE can utilize the DCI-based fallback operation with DAI=1.

In some implementations, the HARQ-ACK codebook generation method according to the BWP change may be different depending on whether the HARQ-ACK codebook set in the above implementation is a semi-static HARQ-ACK codebook or a dynamic HARQ-ACK codebook. In addition, implementations of the present disclosure do not necessarily have to be performed singly, but may be performed in combination of the implementations. That is, a plurality of methods included in the above implementations may be used in combination. For example, in an implementation of the present disclosure, a fallback operation may always be supported.

Also, the downlink association set for the HARQ-ACK may be distinguished according to the BWP index and/or ARI combination indicated by the DCI. For example, if some of the different BWP inter-PDCCH monitoring opportunities overlap, then based on the BWP index and/or ARI value in the DCI transmitted in the overlapping region, the UE can determine which BWP based on the downlink association set to be referred to when generating the HARQ-ACK codebook. That is, if some of the PDCCH monitoring opportunities between different BWPs overlap, then PDCCHs corresponding to PDSCHs in a downlink association set of a specific BWP criterion may have the same BWP index and/or ARI. Specifically, the ARI value may be classified according to whether the ARI field value is the same or not.

In addition, when the PUCCH resource set to be indicated by the ARI is different for each BWP, the HARQ-ACK codebook generation and transmission operation may be performed based on whether the finally selected PUCCH resource is the same.

If the BWP indexes are different and the ARIs are the same, it may be considered that HARQ-ACKs for PDSCHs corresponding to different BWPs are transmitted on the same channel. Specifically, HARQ-ACKs for PDSCHs corresponding to different BWPs can be simultaneously transmitted after HARQ-ACKs are generated for each BWP, and are concurrently transmitted. In order to more efficiently reduce the payload size, HARQ-ACK may be generated by union with respect to the downlink association set for BWP.

In some implementations of the present disclosure, the semi-static HARQ-ACK codebook or the dynamic HARQ-ACK codebook may be UE-specific regardless of BWP, and when the codebook type is set for each BWP, all of them may have the same setting.

In some implementations (e.g., systems compatible with NR), the HARQ-ACK codebook configuration method may be changed through higher layer signaling. In such scenarios, a need may arise to operate without ambiguity between the UE and the gNB during the RRC reset period. In this case, potential ambiguity between the gNB and the UE may be mitigated by operating in the fallback operation mode described in the above implementations within the period.

In the HARQ-ACK codebook type, whether a semi-static HARQ-ACK codebook or a dynamic HARQ-ACK codebook is configured may be changed according to the downlink BWP and/or the uplink BWP. For example, a semi-static HARQ-ACK codebook may be useful when the downlink association set size for HARQ-ACK feedback differs according to the downlink BWP, and conversely, a dynamic HARQ-ACK codebook may be useful.

For example, if the DL association set is large, the size of the HARQ-ACK codebook may be large, so it may be configured as a dynamic HARQ-ACK codebook.

On the other hand, when ambiguity may occur if a DAI-based dynamic HARQ-ACK codebook is used due to a change in channel quality or interference environment according to the downlink BWP, then a semi-static HARQ-ACK codebook may be utilized. In this case, as the UE changes the BWP dynamically, the HARQ-ACK codebook type may also be changed dynamically.

Since the PUCCH will be transmitted in the PCcell (including the PSCell or the PUCCH-SCell), the HARQ-ACK codebook type may be determined according to the PCell (downlink) BWP. For example, the presence of the DAI field in the DCI at SCell may be determined based on whether the HARQ-ACK codebook configured in the BWP of PCell is a dynamic HARQ-ACK codebook. However, even in this case, the fallback DCI may still have a counter DAI field.

On the other hand, a DAI field may be created or excluded based on the time point at which the BWP is actually changed. The UE assumes that the downlink BWP indicated by the PDCCH in the DL association set corresponding to the corresponding HARQ-ACK feedback is the same at the time of HARQ-ACK feedback. For example, all of the DCIs associated with HARQ-ACK feedback may be regarded as assuming a semi-static HARQ-ACK codebook or a dynamic HARQ-ACK codebook. Specifically, the HARQ-ACK feedback may be divided into the BWP index and/or the ARI value in the associated DCI, and the DCIs corresponding to the same HARQ-ACK feedback channel or the same HARQ-ACK feedback channel group may have a BWP index and/or ARI value of the same value.

On the other hand, when the interval or BWP is changed such as when the search space configuration is changed, a fallback operation may be performed. Here, the fallback operation refers to an operation based on the DCI having DAI=1 or an operation of detecting the DCI only at the first PDCCH monitoring occasion of the downlink association set of the configured cell.

On the other hand, due to DCI-based BWP switching, there may be a discrepancy between the required DCI field size and the actually transmitted DCI field size in the changed BWP.

Figure 18:
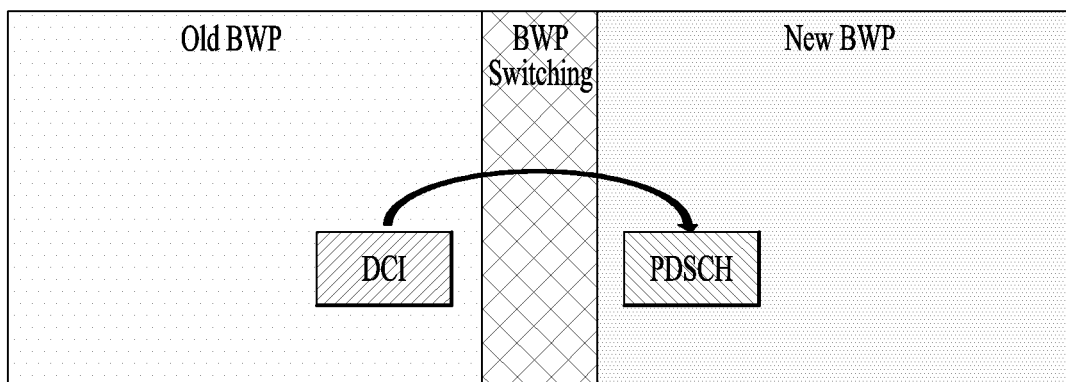
FIG. 18 is a diagram showing an example in which the DCI schedules the PDSCH according to implementations of the present disclosure.

For example, as can be seen in the example of FIG. 18, the DCI is received in the pre-change BWP, and the BWP is subsequently changed according to the received DCI indication. Then, if the DCI schedules the PDSCH in the (post-change) BWP after the change, then inconsistencies may occur between the number of required DCI bits depending on the settings for the BWP before the change and the number of DCI bits required depending on the settings for the BWP after the change. That is, the size of the bits required for the PDSCH scheduling transmitted in the BWP after the change may differ from the size of the bits of the DCI transmitted in the BWP before the actual change.

In this case, the bit field for the relevant setting contained in the DCI field may be zero padded or truncated prior to interpreting the information contained in the DCI, depending on the relevant setting where inconsistencies may occur. That is, when the UE interprets the DCI, it can interpret the DCI assuming that the bit field for the relevant setting is zero padded or truncated.

If the bit field size necessary for the changed BWP is smaller than or equal to the bit field size of the actually transmitted DCI, then the DCI may represent all possible values of the corresponding bit field, so that the scheduling restriction due to the difference in field size does not occur. However, if the bit field size required for the changed BWP is greater than the bit field size of the actually transmitted DCI, then the DCI cannot point to some value of the bit field needed for the changed BWP and thus may limit PDSCH scheduling.

Therefore, according to some implementations of the present disclosure, DCI analysis techniques of the UE will be described, which may address mismatches that occur between the size of the DCI required for scheduling the PDSCH due to the BWP change and the size of the actually transmitted DCI.

Before explaining the analysis techniques for each DCI format, the operation in terms of UE, base station and network according to the implementation of the present disclosure will be described with reference to FIGS. 19 to 21, below.

Figure 19:
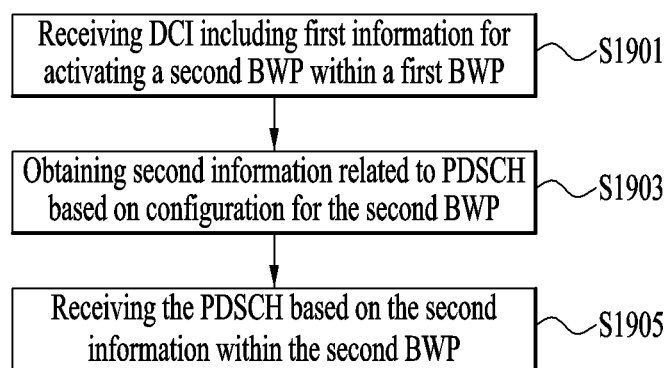
FIGS. 19 to 21 are diagrams showing examples of operations of a terminal, a base station and a network for transmitting and receiving a PDSCH according to implementations of the present disclosure.

FIG. 19 shows an example of an operation procedure according to the present disclosure from a UE perspective. Referring to the example of FIG. 19, the UE receives (S1901) a DCI including first information for changing an active BWP from a first BWP to a second BWP, and transmits the DCI included in the DCI based on the configurations for the second BWP PDSCH scheduling related information (S1903). In some implementations, the bits included in the DCI may be generated based on the configuration for the first BWP. To interpret the scheduling information for the PDSCH received in the second BWP, bits based on settings for the second BWP may be needed. If there is a discrepancy between the number of bits required to interpret the PDSCH scheduling information and the number of bits included in the received DCI, then in accordance with embodiments described below, the UE may interpret the received DCI and obtain scheduling information for the PDSCH.

If the UE obtains the PDSCH scheduling information through the received DCI analysis according to the implementations described further below, the PDSCH may be received in the second BWP based on the obtained PDSCH scheduling information (S1905).

Figure 20:
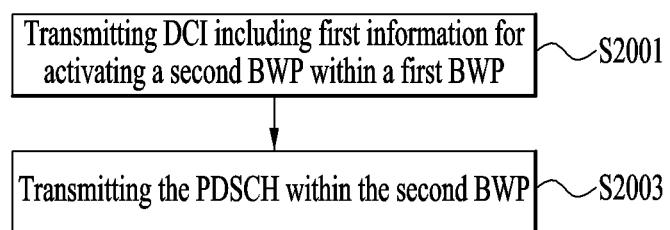

FIG. 20 is a diagram showing an example of an operation procedure of a base station according to an implementation of the present disclosure. Referring to FIG. 20, the BS may transmit, to a UE, a DCI including the first information for changing the active BWP from the first BWP to the second BWP (S2001). In some implementations, in addition to the change of the active BWP, the DCI may also include various information for scheduling the PDSCH. Although the PDSCH may be scheduled to be transmitted in the second BWP, the criterion of DCI generation may be the configuration for the first BWP. For example, the DCI bit size may be determined based on the configuration for the first BWP, and may be inconsistent with the bit size required for the UE in order to actually schedule the PDSCH transmitted from the second BWP.

Therefore, according to some implementations disclosed herein, techniques are disclosed for handling each bit field in view of such inconsistency. However, if the bit size necessary for the second BWP is larger than the bit size of the actually transmitted DCI, then the BS may schedule the PDSCH in the second BWP considering this. For example, the base station may consider the ambiguity of the size of the DCI that can occur due to the inconsistency between the setting for the first BWP and the setting for the second BWP, and may schedule the PDSCH in the second BWP within a range that can be represented by the bit size of the actually transmitted DCI. The BS may transmit the PDSCH in the second BWP based on the DCI (S2003).

Figure 21:
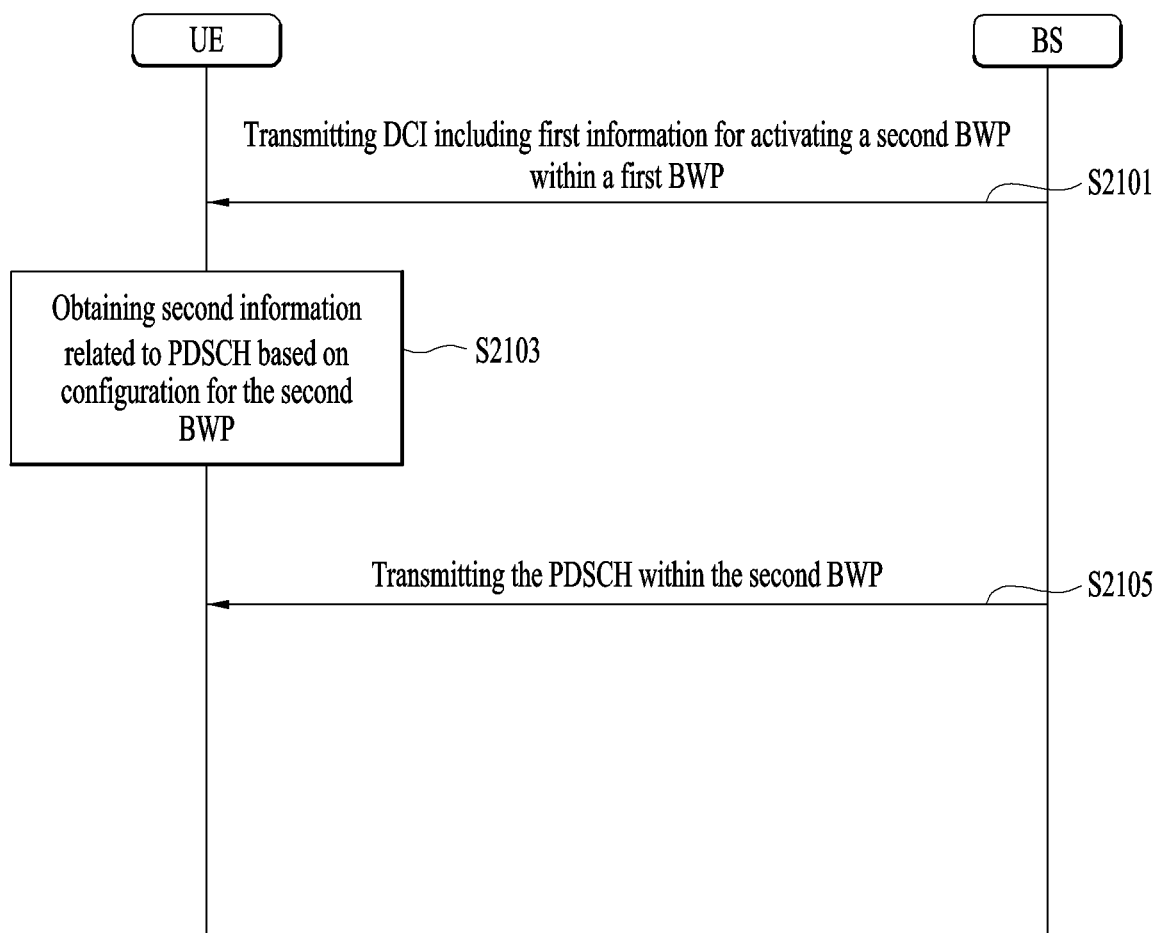

Referring to the example of FIG. 21, a base station may transmit, to a UE, a DCI including first information for changing an active BWP from a first BWP to a second BWP (S2101). In some implementations, the DCI may include various information for scheduling the PDSCH, in addition to the first information for changing the active BWP. In this case, although PDSCH may be scheduled to be transmitted in the second BWP, the criteria for DCI generation may be based on the configuration for the first BWP. For example, the DCI bit size may be determined based on the configuration for the first BWP, and may be inconsistent with the bit size required for the UE in order to actually schedule the PDSCH transmitted from the second BWP.

Therefore, according to some implementations disclosed herein, techniques are disclosed for handling each bit field in view of such inconsistency. However, if the bit size necessary for the second BWP is larger than the bit size of the actually transmitted DCI, then the BS may schedule the PDSCH in the second BWP considering this. For example, the base station may consider the ambiguity of the size of the DCI that can occur due to the inconsistency between the setting for the first BWP and the setting for the second BWP, and may schedule the PDSCH in the second BWP within a range that can be represented by the bit size of the actually transmitted DCI.

In some implementations, the UE receiving the DCI analyzes and acquires PDSCH scheduling related information included in the DCI based on the configuration for the second BWP (S2103). In some implementations, the bits included in the DCI may be generated based on the configuration for the first BWP. To interpret the scheduling information for the PDSCH received in the second BWP, bits based on configurations for the second BWP may be needed. If there is a discrepancy between the number of bits required to interpret the PDSCH scheduling information and the number of bits included in the received DCI, then in accordance with embodiments described below, the UE may interpret the received DCI and obtain scheduling information for the PDSCH.

In some implementations, the BS may transmit the PDSCH in the second BWP based on the DCI (S2105).

Now, a description will be provided of an example of techniques addressing scenarios where a mismatch occurs between the DCI bit size required for the changed BWP and the actually transmitted DCI bit size for each DCI format for scheduling the PDSCH.

Table 4 shows an example of fields of DCI format 0_1 that are zero-padded or truncated before analyzing the DCI, due to the BWP switching.

TABLE 4

| DCI field | Related parameter | Related configuration | Possible values |
|---|---|---|---|
| Frequency domain resource assignment | resourceAllocation | PUSCH-Config | ENUMERATED {resourceAllocationType0, resourceAllocationType1, dynamicSwitch} |
| | rbg-Size | PUSCH-Config | ENUMERATED {config2} |
| | frequencyHoppingOffsetLists | PUSCH-Config | SEQUENCE (SIZE (1..4)) OF INTEGER (1 . . . maxNrofPhysicalResourceBlocks −1) |
| | locationAndBandwidth | BWP provided in BWP-UplinkCommon | INTEGER (0..37949) |
| Time domain resource assignment | pusch-AllocationList | PUSCH-Config | SEQUENCE (SIZE (1..maxNrofUL-Allocations)) OF PUSCH-TimeDomainResourceAllocation |
| Frequency hopping flag | resourceAllocation | PUSCH-Config | ENUMERATED {resourceAllocationType0, resourceAllocationType1, dynamicSwitch} |
| SRS resource indicator | srs-ResourceIdList | SRS-ResourceSet | SEQUENCE (SIZE (1..maxNrofSRS-ResourcesPerSet)) OF SRS-ResourceId |
| | Usage | SRS-ResourceSet | ENUMERATED {beamManagement, codebook, nonCodebook, antennaSwitching} |
| | maxRank | PUSCH-Config | INTEGER (1..4) |
| | txConfig | PUSCH-Config | ENUMERATED {codebook, nonCodebook} |
| Precoding information and number of layers | txConfig | PUSCH-Config | ENUMERATED {codebook, nonCodebook} |
| | transformPrecoder | PUSCH-Config | ENUMERATED {enabled, disabled} |
| | maxRank | PUSCH-Config | INTEGER (1..4) |
| | codebookSubset | PUSCH-Config | ENUMERATED {fullyAndPartialAndNonCoherent, partialAndNonCoherent, nonCoherent} |
| Antenna ports | transformPrecoder | PUSCH-Config | ENUMERATED {enabled, disabled} |
| | txConfig | PUSCH-Config | ENUMERATED {codebook, nonCodebook} |
| | maxRank | PUSCH-Config | INTEGER (1..4) |
| | dmrs-Type | DMRS-UplinkConfig provided in PUSCH-Config | ENUMERATED {type2} |
| | maxLength | DMRS-UplinkConfig provided in PUSCH-Config | ENUMERATED {len2} |
| PTRS-DMRS association | transformPrecoder | PUSCH-Config | ENUMERATED {enabled, disabled} |
| | maxRank | PUSCH-Config | INTEGER (1..4) |
| | phaseTrackingRS | DMRS-UplinkConfig provided in PUSCH-Config | SetupRelease {PTRS-UplinkConfig} |
| beta_offset indicator | betaOffsets | UCI-OnPUSCH provided in PUSCH-Config | CHOICE {dynamic SEQUENCE (SIZE (4)) OF BetaOffsets, semiStatic BetaOffsets} |
| DMRS sequence initialization | transformPrecoder | PUSCH-Config | ENUMERATED {enabled, disabled} |

Referring to Table 4, when analyzing the DCI field included in the DCI format 0_1 according to the BWP change, when performing zero padding on a bit field for frequency/time domain resource allocation, the scheduling flexibility may be limited However, the complexity of the system can be reduced. Also, when performing frequency hopping, zero padding may correspond to non-frequency hopping being used for PUSCH transmission. On the other hand, since the Sounding Reference Signal (SRS) is transmitted after the active UL (Uplink) BWP is changed, the gNB schedules DCI format 0_1 indicating UL BWP change without accurate information on the channel state or beam information for the new BWP do. In addition, when the BWP change is triggered, the Transmission Configuration Indication (TCI), Modulation and Coding Scheme (MCS) and/or Scheduling Request Indicator (SRI) due to BWP change cannot be used because the fallback DCI (e.g. DCI format 0_0) Indicator) may not be accurate. On the other hand, the information about the new BWP may be inaccurate without regard to the number of bits available for each DCI field.

Similarly, in an antenna port or PTRS-DMRS association, since the gNB cannot accurately determine the most suitable DMRS port to transmit PUSCH or PTRS before SRS reception, the bit field size associated with antenna port or PTRS-DMRS is not limited. In other words, the new BWP related antenna port or the PTRS-DMRS association information may be inaccurate regardless of the bit field size limitation because the base station cannot accurately grasp the antenna port or PTRS-DMRS association information for the BWP after the change.

In scenarios where the beta offset indicator is conservatively set as the semi-static beta offset, a dynamic beta offset indicator can be used. On the other hand, one of the values that can be indicated by the beta offset indicator may need to be conservatively set. For example, the conservatively set value may be indicated using a bit field index 0.

The DMRS sequence initialization can be used to support MU-MIMO (Multi User-Multi Input Multi Output). Even if the DCI format 0_1 indicating the UL BWP change does not have a bit field for initializing the DMRS sequence or the value of the DMRS sequence initialization is set to 0, the gNB may set the DMRS sequence of 1 to support other UEs for MU—The DCI indicating the initialization can be scheduled.

To summarize the above description, no restriction is placed on the selection of the bit field of the DCI format 0_1 even if a large part of the bit fields for BWP is truncated after the change. As such, even when the BWP is changed, the bit fields of the DCI format 0_1 can be used as they are. However, irrespective of the size of the bit field, information regarding some DCI fields, such as SRS resource indication, precoding information, number of layers, antenna port and/or PTRS-DMRS association information, may not be accurate.

The following [Table 5] shows an example of fields of the DCI format 1_1 that are zero-padded or truncated before analyzing the DCI, due to the BWP change.

TABLE 5

| DCI field | Related parameter | Related configuration | Possible values |
|---|---|---|---|
| Frequency domain resource assignment | resourceAllocation | PDSCH-Config | ENUMERATED {resourceAllocationType0, resourceAllocationType1, dynamicSwitch} |
| | rbg-Size | PDSCH-Config | ENUMERATED {config1, config2} |
| | locationAndBandwidth | BWP provided in BWP-DownlinkCommon | INTEGER (0..37949) |
| Time domain resource assignment | pusch-AllocationList | PDSCH-Config | SEQUENCE (SIZE (1..maxNrofUL-Allocations)) OF PDSCH-TimeDomainResourceAllocation |
| VRB-to-PRB mapping | resourceAllocation | PDSCH-Config | ENUMERATED {resourceAllocationType0, resourceAllocationType1, dynamicSwitch} |
| PRB bundling size indicator | prb-BundlingType | PDSCH-Config | CHOICE { static SEQUENCE {bundleSize ENUMERATED {n4, wideband} }, dynamic SEQUENCE {bundleSizeSet1 ENUMERATED {n4, wideband, n2-wideband, n4-wideband} bundleSize5Set2 ENUMERATED {n4, wideband}} |
| Rate matching indicator | rateMatchPatternToAddModList | PDSCH-Config | SEQUENCE (SIZE (1..maxNrofRateMatchPatterns)) OF RateMatchPattern |
| ZP CSI-RS trigger | zp-CSI-RS-ResourceToAddModList | PDSCH-Config | SEQUENCE (SIZE (1..maxNrofZP-CSI-RS-Resources)) OF ZP-CSI-RS-Resource |
| For transport block 2 | maxNrofCodeWordsScheduledByDCI | PDSCH-Config | ENUMERATED {n1, n2} |
| Antenna port (s) | dmrs-Type | DMRS-DownlinkConfig provided in PDSCH-Config | ENUMERATED {type2} |
| | maxLength | DMRS-DownlinkConfig provided in PDSCH-Config | ENUMERATED {len2} |

TABLE 5-continued

| DCI field | Related parameter | Related configuration | Possible values |
|---|---|---|---|
| Transmission configuration indication | tci-PresentInDCI | ControlResource Set provided in PDCCH-Config | {enabled} ENUMERATED |
| DMRS sequence initialization | scramblingID1 | DMRS-DownlinkConfig provided in PDSCH-Config | INTEGER (0..65535) |

When performing zero padding on the bit field for frequency/time domain resource allocation, the scheduling flexibility may be limited, but the complexity of the system may be reduced. If the VRB-to-PRB mapping field is zero padded, then non-interleaved VRB-to-PRB mapping may be used for PDSCH transmission.

If the PRB bundling size indicator is zero padded, then a value of second PRB bundling size may be used for PDSCH reception. In some scenarios, even this may not be disadvantageous in terms of scheduling flexibility compared to semi-static PRB bundling size.

The rate matching indicator or the ZP CSI-RS trigger may be meaningful only if the rate matching pattern or the ZP CSI-RS pattern to be indicated (by the rate matching indicator or by the ZP CSI-RS Trigger) overlaps (partially or completely) with the assigned resources that are indicated by the time/frequency domain resource allocation. Therefore, even if there is a restriction on the bit field size of the rate matching indicator or the ZP CSI-RS trigger, the gNB can control so as to prevent overlapping of the allocated resources with the rate matching pattern or the ZP CSI-RS pattern that cannot be indicated by the rate-matching indicator or the ZP CSI-RS trigger, respectively. As such, constraining the bit field size of the rate matching indicator or the ZP CSI-RS trigger is not problematic for UE and base station operation.

In the bit field for transport block 2, if the DCI format 1_1 indicating active DL BWP change can schedule only one transport block, but the new BWP (i.e., the changed BWP) supports up to two transport blocks, then in some implementations, the second transmission block may be disabled. In other words, according to some implementations, if a pre-change BWP in which DCI format 1_1 indicating an active DL BWP change supports only one transport block, but the new BWP supports up to two transport blocks, then the second transport block may be disabled. Therefore, in this case, a condition may be implemented for disabling a transport block, during determination of the transport block size.

As a specific example, even if the parameter 'maxNrofCodeWordsScheduledByDCI' configured by upper layers indicates that two codewords transmissions are enabled, if the DCI indicating the active BWP change contains only one set of MCS, NDI, and RV bitfields, then only one transport block may be enabled. For example, even if 'maxNrofCodeWordsScheduledByDCI' is set to 2 for the BWP after the change by the upper layer, if there is only one set of MCS, NDI, and RV bitfields in the DCI that indicates the change of the active BWP sent in the BWP before the change, then the second transport block may be disabled.

Here, if the second transport block is disabled, then according to some implementations, the UE may detect the DCI assuming that the MCS, NDI, and RV bit field sets for the second transport block in the DCI format 1_1 are transmitted with zero padding. Alternatively, the UE may ignore the MCS, NDI, and RV bit field sets for the second transport block in DCI format 1_1. In some implementations, the UE may perform both actions. That is, the UE can ignore the field set assuming that the MCS, NDI, and RV bit field sets for the second transport block in the DCI format 1_1 are zero padded.

In some implementations, the DMRS sequence initialization may be used to support MU-MIMO. For example, even in scenarios where the DCI format 1_1 (indicating DL BWP switching) does not have a bitfield for initializing the DMRS sequence (and thus the value for initializing the DMRS sequence is set to 0), the gNB may nonetheless schedule DCI indicating DMRS sequence initialization of 1 for another UE to support the MU-MIMO operation.

In other words, for some DCI fields (e.g., Antenna Ports, or Transmission Configuration Indication (TCI)), regardless of the size of the bitfield, the network may not know the information for the field corresponding to the BWP after switching. Consequently, even if a bitfield is truncated significantly to match the new BWP after switching, there is no restriction on the bitfield selection for the DCI format 1_1.

For MIMO-related parameters, since the CSI-RS or SRS will be transmitted after the BWP switching, the gNB may not be able to perform channel estimation or beam detection on the new BWP (i.e., BWP after switching) to schedule the PDSCH or PUSCH. In this case, rather than use a DCI-indicated Transmitted Precoding Matrix Indicator (TPMI), antenna ports, Scheduling Request Indicator (SRI), or Transmission Configuration Indicator (TCI), instead, a default setting may be used, as in initial transmission before RRC (Radio Resource Control) configuration.

As a specific example, if the PUSCH is scheduled by DCI which indicates active UL BWP switching, then the beam information for the PUSCH transmission may re-use the same beam information as the beam information of the PUCCH resource having a lowest index among PUCCH resources. Furthermore, if the PDSCH is scheduled by DCI which indicates an active DL BWP switching, then the beam information for the PDSCH transmission may re-use the same beam information as the beam information of the Control Resource Set (CORESET) having a lowest index among CORESETs.

In some implementations, such operations may ignore DCI fields that are not present in the fallback DCI format, such that operations behave analogously to those of PDSCH/PUSCH scheduling that is scheduled by fallback DCI. In other words, if a default setting is assumed, it may be considered to ignore DCI fields that do not exist in the fallback DCI format, in order to simplify the DCI directing the BWP change.

For example, consider a scenario where DCI schedules a PDSCH transmission in a post-switching BWP, and where that DCI indicates the BWP switching. In such scenarios, Quasi Co-Location (QCL) information, spatial relation information, or Transmission Configuration Indication (TCI) information may be assumed to be the same as the CORESET of the lowest index.

For example, after a change in BWP by DCI indicating the BWP switching, the QCL information, spatial relationship information, or TCI information for the PDSCH transmission scheduled in the BWP may be the same as the QCL information, the spatial relationship information, or the TCI information that is configured for the CORESET associated with the DCI indicating the BWP change. Alternatively, it may be assumed that the new BWP (i.e., BWP after switching) is equal to QCL information, spatial relationship information, or TCI information for the PDSCH that is scheduled by the fallback DCI.

Similarly, in PUSCH transmission that is scheduled by DCI indicating the BWP switching, it may be assumed that QCL information, spatial relationship information, or SRS resource indicator information is the same as the PUCCH of the lowest index, or that it is the same as QCL information, spatial relationship information, or SRS resource indicator information for a Msg3 in the new BWP (post-switching). Specifically, the above-described techniques may be applied collectively to the DCI for changing the BWP.

In some implementations, the DCI-based BWP change may occur flexibly, and in some cases, operations based on the default setting may be performed only for a specific combination of MIMO-related parameters, in order to use the DCI indication-based MIMO parameter value. For example, when the MIMO-related parameters are all set to 0, the operation according to the default setting can be performed.

Figure 22:
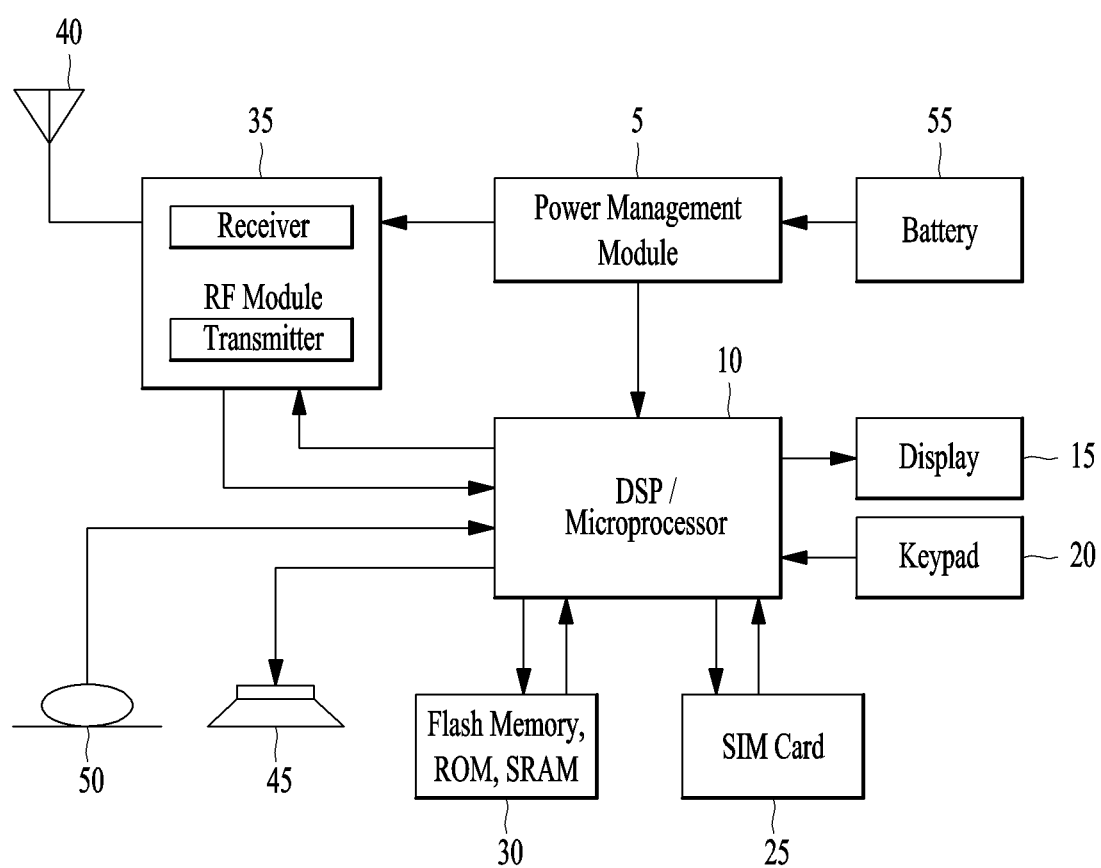
FIG. 22 is a block diagram illustrating an example of components of a wireless device according to implementations of the present disclosure.

FIG. 22 shows an example of a radio communication apparatus according to an implementation of the present disclosure.

The wireless communication apparatus illustrated in FIG. 22 may represent a terminal and/or a base station according to an implementation of the present disclosure. However, the wireless communication apparatus of FIG. 22 is not necessarily limited to the terminal and/or the base station according to the present disclosure, and may implement various types of apparatuses, such as a vehicle communication system or apparatus, a wearable apparatus, a laptop, etc.

In the example of FIG. 22, a terminal and/or a base station according to an implementation of the present disclosure includes at least one processor 10 such as a digital signal processor or a microprocessor, a transceiver 35, a power management module 5, an antenna 40, a battery 55, a display 15, a keypad 20, at least one memory 30, a subscriber identity module (SIM) card 25, a speaker 45, and a microphone 50, and the like. In addition, the terminal and/or the base station may include a single antenna or multiple antennas. The transceiver 35 may be also referred to as an RF module.

The at least one processor 10 may be configured to implement the functions, procedures and/or methods described in FIGS. 1 to 21. In at least some of the implementations described in FIGS. 1 to 21, the at least one processor 10 may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the terminal and/or base station such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna 40 facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the terminal and/or the base station. For example, a camera may be further connected to the at least one processor 10, which may be used for a variety of services such as autonomous navigation, vehicle safety services, and the like.

FIG. 22 merely illustrates one example of an apparatuses constituting the terminal and/or the base station, and the present disclosure is not limited thereto. For example, some components, such as keypad 20, Global Positioning System (GPS) chip, sensor, speaker 45 and/or microphone 50 may be excluded for terminal and/or base station implementations in some implementations.

Specifically, in order to implement implementations of the present disclosure, an example of operations of the wireless communication apparatus represented in FIG. 22 in the case of a terminal according to an implementation of the present disclosure will be described. If the wireless communication device is a terminal according to an implementation of the present disclosure, the at least one processor 10 may include a transceiver 35 to receive a DCI containing first information for changing an active BWP from a first BWP to a second BWP, and may interpret and obtain PDSCH scheduling related information included in the DCI based on the configuration for the second BWP. The bits included in the DCI may be generated based on the configuration for the first BWP, and bits based on configurations for the second BWP may be needed to interpret the scheduling information for the PDSCH received at the second BWP. If there is a discrepancy between the number of bits required to interpret the PDSCH scheduling information and the number of bits included in the received DCI, then the DCI may be interpreted according to the implementations described based on FIGS. 1 to 21 and [Table 4] to [Table 5] to obtain the scheduling information for the PDSCH.

If the at least one processor 10 obtains PDSCH scheduling information through a DCI interpretation in accordance with the implementations described based on FIGS. 1 to 21 and [Table 4] to [Table 5], then the at least one processor 10 may control the transceiver 35 to receive the PDSCH in the second BWP based on the obtained PDSCH scheduling information.

In some implementations of the present disclosure, when the wireless communication apparatus represented in FIG. 15 is a base station, the at least one processor 10 may control the transceiver 35 to send the DCI to the UE that includes the first information for changing the active BWP from the first BWP to the second BWP. In this case, the DCI may include various information for scheduling the PDSCH in addition to the change of the active BWP. In this case, the PDSCH may be scheduled to be transmitted in the second BWP, for example. That is, the DCI bit size may be determined based on the setting for the first BWP, and may be inconsistent with the bit size required for the UE in order to actually schedule the PDSCH transmitted from the second BWP. In such scenarios, the interpretation of each bit field caused by such inconsistency may be performed in accordance with implementations described based on FIGS. 1 to 21 and [Table 4] to [Table 5].

However, if the bit size necessary for the second BWP is larger than the bit size of the actually transmitted DCI, then the BS may schedule the PDSCH in the second BWP considering this. For example, if the UE 10 has a mismatch between the configurations for the first BWP and the configurations for the second BWP, given the ambiguity of the size of the DCI that can occur, then the PDSCH in the second BWP may be scheduled within a range that can be represented by the bit size of the actually transmitted DCI. Meanwhile, the base station may control the transceiver 35 to transmit the PDSCH in the second BWP based on the DCI.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

Implementations according to the present disclosure may be implemented by various means, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

Although the method and apparatus for transmitting and receiving the downlink data channel have been described with reference to the fifth generation NewRAT system, the present disclosure can be applied to various wireless communication systems other than the fifth generation NewRAT system.

The invention claimed is:

1. A method for receiving a Physical Downlink Shared Channel (PDSCH) by a user equipment (UE) in a wireless communication system, the method comprising:
   receiving, in a first Bandwidth Part (BWP), Downlink Control Information (DCI) including first information for switching an active BWP from the first BWP to a second BWP and second information related to at least one Transport Block (TB) for the PDSCH; and
   receiving, in the second BWP, the PDSCH based on the first information and the second information,
   wherein, based on (i) the DCI scheduling only 1 TB and (ii) a higher layer parameter 'maxNrofCodeWordsScheduledByDCI' for the second BWP being configured for supporting 2 TBs, the UE assumes, for interpreting the DCI, that information related to a second TB among the 2 TBs is disabled zero-padded, and
   wherein the UE obtains transmission configuration information (TCI) for the PDSCH received in the second BWP, based on that the DCI received in the first BWP indicates the switching of the active BWP.

2. The method of claim 1, wherein the second information includes bits set for Modulation and Coding Scheme (MCS), New data Indicator (NDI) and Redundancy Version (RV) for a first TB among the 2 TBs.

3. An apparatus for receiving a Physical Downlink Shared Channel (PDSCH) in a wireless communication system, the apparatus comprising:
   at least one processor; and
   at least one memory operably connectable to the at least one processor and storing instructions that, when executed by the at least one processor, perform operations comprising:
   receiving, in a first Bandwidth Part (BWP), Downlink Control Information (DCI) including first information for switching an active BWP from the first BWP to a second BWP and second information related to at least one Transport Block (TB) for the PDSCH; and
   receiving, in the second BWP, the PDSCH based on the first information and the second information,
   wherein, based on (i) the DCI scheduling only 1 TB and (ii) a higher layer parameter 'maxNrofCodeWordsScheduledByDCI' for the second BWP being configured for supporting 2 TBs, the apparatus assumes, for interpreting the DCI, that information related to a second TB among the 2 TBs is zero-padded, and
   wherein the apparatus obtains transmission configuration information (TCI) for the PDSCH received in the second BWP, based on that the DCI received in the first BWP indicates the switching of the active BWP.

4. The apparatus of claim 3, wherein the second information includes bits set for Modulation and Coding Scheme (MCS), New data Indicator (NDI) and Redundancy Version (RV) for a first TB among the 2 TBs.

5. At least one non-transitory computer storage medium storing instructions that, based on being executed by at least one processor, control a user equipment (UE) in a wireless communication system to perform operations comprising:
   receiving, in a first Bandwidth Part (BWP), Downlink Control Information (DCI) including first information for switching an active BWP from the first BWP to a second BWP and second information related to at least one Transport Block (TB) for a Physical Downlink Shared Channel (PDSCH); and
   receiving, in the second BWP, the PDSCH based on the first information and the second information,
   wherein, based on (i) the DCI scheduling only 1 TB and (ii) a higher layer parameter 'maxNrofCodeWordsScheduledByDCI' for the second BWP being configured for supporting 2 TBs, the UE assumes, for interpreting the DCI, that information related to a second TB among the 2 TBs is zero-padded, and
   wherein the UE obtains transmission configuration information (TCI) for the PDSCH received in the second BWP, based on that the DCI received in the first BWP indicates the switching of the active BWP.

* * * * *

UNITED STATES PATENT AND TRADEMARK OFFICE
CERTIFICATE OF CORRECTION

PATENT NO. : 11,265,860 B2
APPLICATION NO. : 16/694677
DATED : March 1, 2022
INVENTOR(S) : Daesung Hwang and Yun Jung Yi It is certified that error appears in the above-identified patent and that said Letters Patent is hereby corrected as shown below:

In the Claims

Column 36, Line 63; in Claim 1, before "zero-padded" delete ""disabled"" therefore.

Signed and Sealed this
Twenty-third Day of August, 2022

Katherine Kelly Vidal
*Director of the United States Patent and Trademark Office*